US011768945B2

(12) United States Patent
Chiarelli et al.

(10) Patent No.: US 11,768,945 B2
(45) Date of Patent: Sep. 26, 2023

(54) MACHINE LEARNING SYSTEM FOR DETERMINING A SECURITY VULNERABILITY IN COMPUTER SOFTWARE

(71) Applicant: Allstate Insurance Company, Northbrook, IL (US)

(72) Inventors: John Matthew Chiarelli, Arlington Heights, IL (US); William Anthony McCormick, Belfast (IE); Nathan Edward Shock, Aurora, IL (US); Elizabeth Ann Kovick, Burbank, IL (US); Keling Chen, Scottsdale, AZ (US); Hee Yeun Kim, Frisco, TX (US); Ryan Kresse, Pittsburgh, PA (US); Edward Jay Sabijon, Charleston, SC (US)

(73) Assignee: Allstate Insurance Company, Northbrook, IL (US)

( * ) Notice: Subject to any disclaimer, the term of this patent is extended or adjusted under 35 U.S.C. 154(b) by 433 days.

(21) Appl. No.: 16/842,092

(22) Filed: Apr. 7, 2020

(65) Prior Publication Data

US 2021/0312058 A1 Oct. 7, 2021

(51) Int. Cl.
*G06F 21/57* (2013.01)
*G06N 20/00* (2019.01)
(Continued)

(52) U.S. Cl.
CPC .......... *G06F 21/577* (2013.01); *G06N 20/00* (2019.01); *G06N 20/20* (2019.01); *G06Q 10/067* (2013.01); *G06F 2221/033* (2013.01)

(58) Field of Classification Search
None
See application file for complete search history.

(56) References Cited

U.S. PATENT DOCUMENTS 8,392,997 B2   3/2013   Chen et al.
8,595,845 B2   11/2013  Basavapatna et al.
(Continued)

FOREIGN PATENT DOCUMENTS

KR     101687716 B1    12/2016
WO     2014107104 A1    7/2014
(Continued)

OTHER PUBLICATIONS

Harer et al "Automated Software Vulnerability Detection with Machine Learning," Aug. 2, 2018 (pp. 1-8) (Year: 2018).*
(Continued)

*Primary Examiner* — Luu T Pham
*Assistant Examiner* — James J Wilcox
(74) *Attorney, Agent, or Firm* — Dinsmore & Shohl LLP

(57) ABSTRACT

Methods, computer-readable media, software, and apparatuses may retrieve, from an industry standard setting scoring system and for a vulnerability, a temporal score based on a pre-revision version of a scoring system, and predict, based on a machine learning model and based on the temporal score for the vulnerability, an updated temporal score based on a post-revision version of the scoring system. A mitigating factor score, indicative of a mitigation applied to the vulnerability by an enterprise organization, may be determined. A risk score may be generated for each vulnerability, as a composite of the updated temporal score and the mitigating factor score. The risk scores for vulnerabilities in a collection of vulnerabilities may be aggregated to determine an enterprise risk score for the enterprise organization. In some instances, the enterprise risk score may be displayed via a graphical user interface.

17 Claims, 6 Drawing Sheets

(51) Int. Cl.
*G06N 20/20* (2019.01)
*G06Q 10/067* (2023.01)

(56) References Cited

U.S. PATENT DOCUMENTS

| | | | |
|---|---|---|---|
| 9,020,864 B2* | 4/2015 | Perkowitz | G06N 20/00 |
| | | | 706/46 |
| 9,294,498 B1 | 3/2016 | Yampolskiy et al. | |
| 9,317,692 B2 | 4/2016 | Elder et al. | |
| 9,406,092 B2* | 8/2016 | Adams | G06Q 30/0631 |
| 9,501,647 B2 | 11/2016 | Yampolskiy et al. | |
| 9,537,884 B1* | 1/2017 | Raugas | H04L 63/1433 |
| 9,749,349 B1 | 8/2017 | Czarny et al. | |
| 9,800,605 B2 | 10/2017 | Baikalov et al. | |
| 9,923,917 B2 | 3/2018 | Fausto et al. | |
| 10,051,044 B2* | 8/2018 | Culverhouse | H04L 67/06 |
| 10,062,039 B1* | 8/2018 | Lockett | G06N 3/044 |
| 10,063,582 B1* | 8/2018 | Feng | H04L 63/1433 |
| 10,095,866 B2 | 10/2018 | Gong et al. | |
| 10,261,993 B1* | 4/2019 | Niekrasz | G06F 16/35 |
| 10,264,009 B2 | 4/2019 | Smyth et al. | |
| 10,289,838 B2 | 5/2019 | Singla et al. | |
| 10,320,829 B1 | 6/2019 | Banga et al. | |
| 10,372,915 B2 | 8/2019 | Inagaki et al. | |
| 10,440,180 B1* | 10/2019 | Jayapalan | G06N 5/041 |
| 10,490,191 B1* | 11/2019 | Benkreira | G10L 15/16 |
| 10,521,235 B1* | 12/2019 | Balasubramanian | |
| | | | G06F 9/3838 |
| 10,528,916 B1* | 1/2020 | Taylor | G06N 5/01 |
| 10,621,019 B1* | 4/2020 | Faulhaber, Jr. | G06N 5/04 |
| 10,621,540 B1* | 4/2020 | Huddar | G06Q 30/018 |
| 10,642,719 B1* | 5/2020 | Balasubramanian | |
| | | | G06F 11/302 |
| 10,645,455 B1* | 5/2020 | Glaeser | H04N 21/4666 |
| 10,664,512 B1* | 5/2020 | He | G06N 3/045 |
| 10,671,854 B1* | 6/2020 | Mahyar | H04N 21/251 |
| 10,679,390 B1* | 6/2020 | Solgi | G06N 7/01 |
| 10,699,010 B2* | 6/2020 | Subbarayan | G06F 40/216 |
| 10,715,668 B1* | 7/2020 | Jayapalan | G06Q 30/01 |
| 10,747,544 B1* | 8/2020 | Balasubramanian | |
| | | | G06F 11/0751 |
| 10,769,542 B1* | 9/2020 | Dhalwani | G01W 1/02 |
| 10,839,313 B2* | 11/2020 | Belous | G06Q 30/0601 |
| 10,846,716 B1* | 11/2020 | Chow | G06T 7/0002 |
| 10,860,629 B1* | 12/2020 | Gangadharaiah | G06F 16/3329 |
| 10,902,515 B1* | 1/2021 | Hoover | G06Q 30/0631 |
| 10,929,772 B1* | 2/2021 | Diuk Wasser | G06N 20/00 |
| 10,958,784 B1* | 3/2021 | Way | G06Q 40/02 |
| 10,965,691 B1* | 3/2021 | Maxwell | G06F 7/24 |
| 10,970,530 B1* | 4/2021 | Adam | G06V 30/416 |
| 10,978,179 B2* | 4/2021 | Beltre | G06Q 50/22 |
| 10,984,446 B1* | 4/2021 | Becker | G06N 20/00 |
| 10,990,850 B1* | 4/2021 | Chen | G06V 10/7747 |
| 11,032,316 B1* | 6/2021 | Sidhu | G06F 18/22 |
| 11,074,470 B2* | 7/2021 | Merai | G06N 3/08 |
| 11,182,695 B1* | 11/2021 | Kirsche | G06N 6/54 |
| 11,250,515 B1* | 2/2022 | Feiteira | G06N 20/00 |
| 11,270,375 B1* | 3/2022 | Jennings | G06N 20/00 |
| 11,272,164 B1* | 3/2022 | Xing | G06F 9/445 |
| 11,288,453 B1* | 3/2022 | Vinicombe | G06F 40/284 |
| 11,295,165 B1* | 4/2022 | Agarwal | G06F 18/2413 |
| 11,301,762 B1* | 4/2022 | Chen | G06F 16/116 |
| 11,302,424 B2* | 4/2022 | Will | G06N 5/01 |
| 11,341,367 B1* | 5/2022 | Barbosa | G06F 18/2148 |
| 11,367,117 B1* | 6/2022 | Cheng | G06Q 40/30 |
| 11,373,119 B1* | 6/2022 | Doshi | H04L 47/70 |
| 11,386,469 B1* | 7/2022 | Gobel | G06F 18/2113 |
| 11,386,665 B2* | 7/2022 | Agarwal | G11B 27/031 |
| 11,423,330 B2* | 8/2022 | McCourt, Jr. | G06F 17/18 |
| 11,429,893 B1* | 8/2022 | Tong | G06N 20/00 |
| 11,430,171 B2* | 8/2022 | Amer | G06F 16/345 |
| 11,461,534 B2* | 10/2022 | Marshall | G06V 10/82 |
| 11,481,647 B1* | 10/2022 | Bataineh | G06N 20/00 |
| 11,488,310 B1* | 11/2022 | Nagarajan | G06V 10/25 |
| 11,500,910 B2* | 11/2022 | Dash | G06F 17/18 |
| 11,531,846 B1* | 12/2022 | Bodapati | G06N 20/00 |
| 11,537,874 B1* | 12/2022 | Wang | G06N 3/08 |
| 11,544,621 B2* | 1/2023 | Chen | G06F 16/22 |
| 11,544,810 B2* | 1/2023 | Rao | G06Q 10/087 |
| 11,574,243 B1* | 2/2023 | Mallya Kasaragod | |
| | | | G06F 9/505 |
| 11,592,827 B1* | 2/2023 | Lam | G06N 20/00 |
| 11,593,675 B1* | 2/2023 | Garg | G06F 21/54 |
| 11,593,704 B1* | 2/2023 | Jenatton | G06F 16/2455 |
| 11,593,705 B1* | 2/2023 | Rouesnel | G06N 20/00 |
| 11,593,818 B2* | 2/2023 | Gilmore | G06Q 30/0201 |
| 11,599,927 B1* | 3/2023 | Flunkert | G06F 40/10 |
| 11,605,021 B1* | 3/2023 | Khare | G06N 5/046 |
| 2007/0180490 A1* | 8/2007 | Renzi | G06F 21/604 |
| | | | 726/1 |
| 2008/0016563 A1* | 1/2008 | McConnell | G06Q 10/00 |
| | | | 726/22 |
| 2009/0049553 A1* | 2/2009 | Vasudeva | H04L 67/02 |
| | | | 726/25 |
| 2010/0058475 A1* | 3/2010 | Thummalapenta | |
| | | | H04L 63/1433 |
| | | | 714/38.14 |
| 2011/0099122 A1* | 4/2011 | Bright | G06Q 10/04 |
| | | | 705/348 |
| 2012/0016678 A1 | 1/2012 | Gruber et al. | |
| 2012/0036103 A1 | 2/2012 | Stupp et al. | |
| 2012/0072247 A1* | 3/2012 | Rosauer | G06Q 10/067 |
| | | | 705/348 |
| 2012/0290521 A1* | 11/2012 | Frank | G06N 20/00 |
| | | | 706/45 |
| 2013/0103624 A1* | 4/2013 | Thieberger | G06N 20/00 |
| | | | 706/12 |
| 2013/0227695 A1* | 8/2013 | Shankar | G06F 21/577 |
| | | | 726/25 |
| 2013/0253979 A1* | 9/2013 | Williams | G06Q 10/0635 |
| | | | 705/7.28 |
| 2014/0090069 A1* | 3/2014 | Pistoia | G06F 21/577 |
| | | | 726/25 |
| 2014/0172495 A1 | 6/2014 | Schneck et al. | |
| 2015/0100524 A1* | 4/2015 | Pantel | G06N 20/00 |
| | | | 706/12 |
| 2015/0163242 A1* | 6/2015 | Laidlaw | G06N 7/023 |
| | | | 726/22 |
| 2015/0363401 A1* | 12/2015 | Chen | G06F 16/24578 |
| | | | 707/723 |
| 2016/0004627 A1* | 1/2016 | Farchi | G06N 7/01 |
| | | | 717/127 |
| 2016/0048766 A1* | 2/2016 | McMahon | G06Q 40/08 |
| | | | 706/12 |
| 2016/0065598 A1* | 3/2016 | Modi | H04L 63/1416 |
| | | | 726/23 |
| 2016/0110528 A1* | 4/2016 | Gupta | G06F 21/31 |
| | | | 726/19 |
| 2016/0148115 A1* | 5/2016 | Sirosh | G06N 20/00 |
| | | | 706/11 |
| 2016/0170996 A1* | 6/2016 | Frank | G06Q 30/0203 |
| | | | 707/748 |
| 2016/0217288 A1* | 7/2016 | Serrano | G06F 21/577 |
| 2016/0248797 A1 | 8/2016 | Yampolskiy et al. | |
| 2016/0267396 A1* | 9/2016 | Gray | G06N 20/00 |
| 2016/0314255 A1* | 10/2016 | Cook | G06F 16/906 |
| 2017/0061528 A1* | 3/2017 | Arora | G06F 16/951 |
| 2017/0161618 A1* | 6/2017 | Swaminathan | G06F 16/23 |
| 2017/0161640 A1* | 6/2017 | Shamir | G06N 20/00 |
| 2017/0178080 A1* | 6/2017 | Abebe | G06F 16/383 |
| 2017/0213037 A1* | 7/2017 | Toledano | H04L 63/06 |
| 2017/0308802 A1* | 10/2017 | Ramsoy | G06N 20/00 |
| 2018/0018587 A1* | 1/2018 | Kobayashi | G06N 20/00 |
| 2018/0121953 A1* | 5/2018 | Zhang | G06Q 30/0254 |
| 2018/0121964 A1* | 5/2018 | Zhang | G06Q 30/0277 |
| 2018/0129960 A1* | 5/2018 | Caballero | G06Q 50/01 |
| 2018/0139293 A1* | 5/2018 | Dimson | H04L 51/214 |
| 2018/0146004 A1* | 5/2018 | Belfiore, Jr. | G06F 21/577 |
| 2018/0157845 A1* | 6/2018 | Mehta | G06F 21/577 |
| 2018/0189074 A1* | 7/2018 | Kulkarni | G06F 9/451 |
| 2018/0189288 A1* | 7/2018 | Zhang | G06N 20/00 |
| 2018/0218283 A1* | 8/2018 | Jenson | G06Q 50/01 |

(56) References Cited

U.S. PATENT DOCUMENTS

| | | | |
|---|---|---|---|
| 2018/0232523 A1* | 8/2018 | Copty | G06F 21/577 |
| 2018/0234442 A1* | 8/2018 | Luo | G06N 7/01 |
| 2018/0239949 A1* | 8/2018 | Chander | G06F 18/214 |
| 2018/0253661 A1* | 9/2018 | Strauss | G06N 20/00 |
| 2018/0260860 A1* | 9/2018 | Devanathan | G06F 16/353 |
| 2018/0276372 A1* | 9/2018 | Crabtree | G06F 21/566 |
| 2018/0276718 A1* | 9/2018 | Thomas | G06Q 30/0276 |
| 2018/0285740 A1* | 10/2018 | Smyth | G06N 3/082 |
| 2018/0315182 A1* | 11/2018 | Rapaka | G06T 7/0012 |
| 2018/0349795 A1* | 12/2018 | Boyle | G06Q 10/063 |
| 2018/0351987 A1* | 12/2018 | Patel | G06F 21/577 |
| 2018/0373991 A1* | 12/2018 | Rosenberg | G06N 5/041 |
| 2019/0042081 A1* | 2/2019 | Rosenberg | G06F 3/04847 |
| 2019/0043068 A1* | 2/2019 | Livne | G06Q 30/0205 |
| 2019/0052665 A1 | 2/2019 | Mahieu et al. | |
| 2019/0057164 A1* | 2/2019 | Zhou | G06F 16/9032 |
| 2019/0065744 A1* | 2/2019 | Gaustad | G06F 21/562 |
| 2019/0066136 A1* | 2/2019 | Kopikare | G06N 5/046 |
| 2019/0080347 A1* | 3/2019 | Smith | G06Q 30/0269 |
| 2019/0095961 A1* | 3/2019 | Wu | G06Q 30/0255 |
| 2019/0102564 A1* | 4/2019 | Li | G06N 3/04 |
| 2019/0102693 A1* | 4/2019 | Yates | G06N 20/00 |
| 2019/0102706 A1* | 4/2019 | Frank | G06N 5/046 |
| 2019/0130304 A1* | 5/2019 | Gupta | G06F 16/783 |
| 2019/0138731 A1* | 5/2019 | Tan | G06F 11/3608 |
| 2019/0141183 A1* | 5/2019 | Chandrasekaran | G06N 5/01 |
| 2019/0147038 A1* | 5/2019 | Nelson | G06F 40/211 704/9 |
| 2019/0155633 A1* | 5/2019 | Faulhaber, Jr. | G06N 5/04 |
| 2019/0156244 A1* | 5/2019 | Faulhaber, Jr. | G06F 9/5072 |
| 2019/0156247 A1* | 5/2019 | Faulhaber, Jr. | G06N 3/08 |
| 2019/0156952 A1* | 5/2019 | Simhon | G16H 50/70 |
| 2019/0163917 A1* | 5/2019 | Bellis | G06N 20/00 |
| 2019/0164069 A1* | 5/2019 | Zhivotvorev | G06N 20/00 |
| 2019/0164082 A1* | 5/2019 | Wu | G06N 20/00 |
| 2019/0164245 A1* | 5/2019 | Takacs | G06Q 30/0205 |
| 2019/0166150 A1 | 5/2019 | Bulut et al. | |
| 2019/0182059 A1* | 6/2019 | Abdou | H04L 51/52 |
| 2019/0197244 A1* | 6/2019 | Fong | G06N 20/00 |
| 2019/0197361 A1* | 6/2019 | Rajendran | G06N 20/20 |
| 2019/0197578 A1* | 6/2019 | Sherman | G06F 17/18 |
| 2019/0205901 A1* | 7/2019 | Zhang | G06N 20/00 |
| 2019/0213403 A1* | 7/2019 | Chawla | G06Q 30/0201 |
| 2019/0236090 A1* | 8/2019 | Singh | H04N 21/2353 |
| 2019/0245894 A1* | 8/2019 | Epple | H04L 63/1433 |
| 2019/0258807 A1* | 8/2019 | DiMaggio | G06F 21/577 |
| 2019/0258953 A1* | 8/2019 | Lang | G06N 3/0454 |
| 2019/0259499 A1* | 8/2019 | Hong | G16H 50/20 |
| 2019/0266513 A1* | 8/2019 | Eban | G06N 20/00 |
| 2019/0268366 A1 | 8/2019 | Zeng et al. | |
| 2019/0290233 A1* | 9/2019 | Madabhushi | A61B 6/504 |
| 2019/0318026 A1* | 10/2019 | Joseph | G06F 16/24553 |
| 2019/0319945 A1 | 10/2019 | Levy et al. | |
| 2019/0324413 A1* | 10/2019 | Ferroni | G05B 13/027 |
| 2019/0339824 A1* | 11/2019 | Hamedi | G06V 10/761 |
| 2019/0340537 A1* | 11/2019 | Fung | G06N 20/00 |
| 2019/0340684 A1 | 11/2019 | Belanger et al. | |
| 2019/0355269 A1* | 11/2019 | Pan | G06F 18/22 |
| 2019/0362242 A1* | 11/2019 | Pillai | G06N 5/01 |
| 2019/0377880 A1* | 12/2019 | Kolychev | G06F 21/577 |
| 2019/0378048 A1* | 12/2019 | Shrivastava | G06F 16/9535 |
| 2019/0379699 A1* | 12/2019 | Katragadda | H04L 63/1425 |
| 2019/0384814 A1* | 12/2019 | McGoldrick | G06N 5/046 |
| 2020/0005080 A1* | 1/2020 | Cogan | G06Q 10/10 |
| 2020/0005095 A1* | 1/2020 | Richiardi | G16H 30/40 |
| 2020/0005166 A1* | 1/2020 | Reich | G06N 5/04 |
| 2020/0012796 A1* | 1/2020 | Trepagnier | G06N 20/00 |
| 2020/0012919 A1* | 1/2020 | Bathaee | G06N 20/10 |
| 2020/0012962 A1* | 1/2020 | Dent | G06F 9/5011 |
| 2020/0019883 A1* | 1/2020 | McCourt, Jr. | G06N 7/00 |
| 2020/0042370 A1* | 2/2020 | Kao | G06F 11/008 |
| 2020/0045049 A1* | 2/2020 | Apostolopoulos | G06N 20/00 |
| 2020/0057857 A1* | 2/2020 | Roytman | G06N 7/005 |
| 2020/0065772 A1* | 2/2020 | Whitehead | G06Q 10/1053 |
| 2020/0065863 A1* | 2/2020 | Hong | G06N 5/04 |
| 2020/0078688 A1* | 3/2020 | Kaethler | G06N 20/20 |
| 2020/0082004 A1* | 3/2020 | Dubost | G06N 20/00 |
| 2020/0097545 A1* | 3/2020 | Chatterjee | G06F 40/30 |
| 2020/0097664 A1* | 3/2020 | Nakajima | G06F 21/562 |
| 2020/0118038 A1* | 4/2020 | Ghoche | G06N 20/00 |
| 2020/0125639 A1* | 4/2020 | Doyle | G06F 40/30 |
| 2020/0125928 A1* | 4/2020 | Doyle | G06V 30/19147 |
| 2020/0134083 A1* | 4/2020 | Elliman | G06F 3/0482 |
| 2020/0142951 A1* | 5/2020 | Minami | G06F 17/18 |
| 2020/0143114 A1* | 5/2020 | Dua | G06F 3/167 |
| 2020/0143286 A1* | 5/2020 | Frank | G06N 5/02 |
| 2020/0151042 A1* | 5/2020 | Spencer | G06N 20/00 |
| 2020/0151748 A1* | 5/2020 | Saha | G06Q 30/0202 |
| 2020/0159919 A1* | 5/2020 | Sims | G06F 21/554 |
| 2020/0175084 A1* | 6/2020 | Hatch | G06F 16/9536 |
| 2020/0177614 A1* | 6/2020 | Burns | H04L 63/20 |
| 2020/0190568 A1* | 6/2020 | Boroni Martins | G06N 20/10 |
| 2020/0195667 A1* | 6/2020 | Li | H04L 63/1433 |
| 2020/0202272 A1* | 6/2020 | Aravamudhan | G06Q 10/06311 |
| 2020/0210590 A1* | 7/2020 | Doyle | G06N 20/00 |
| 2020/0210899 A1* | 7/2020 | Guo | G06Q 20/4016 |
| 2020/0210924 A1* | 7/2020 | Ghosh | G06N 5/022 |
| 2020/0227175 A1* | 7/2020 | Salomon | G16H 50/70 |
| 2020/0228550 A1* | 7/2020 | Ravindranathan | H04L 63/1425 |
| 2020/0233916 A1* | 7/2020 | Hoots | G06F 16/9538 |
| 2020/0242360 A1* | 7/2020 | Alexander | G06V 30/194 |
| 2020/0250472 A1* | 8/2020 | Abhyankar | G06T 11/206 |
| 2020/0258141 A1* | 8/2020 | Habraken | G06Q 30/0633 |
| 2020/0258600 A1* | 8/2020 | Will | G16H 20/10 |
| 2020/0272919 A1* | 8/2020 | Haimson | G16H 50/20 |
| 2020/0273079 A1* | 8/2020 | Raviv | G06N 20/00 |
| 2020/0274894 A1* | 8/2020 | Argoeti | H04L 63/102 |
| 2020/0278901 A1* | 9/2020 | Singh | G06N 5/02 |
| 2020/0285952 A1* | 9/2020 | Liu | G06N 3/08 |
| 2020/0286616 A1* | 9/2020 | Dunn | G06N 3/08 |
| 2020/0302506 A1* | 9/2020 | Parker | G06Q 30/0631 |
| 2020/0311601 A1* | 10/2020 | Robinson | G06N 3/042 |
| 2020/0311617 A1* | 10/2020 | Swan | G06F 9/45558 |
| 2020/0320411 A1* | 10/2020 | Hebenthal | G06F 18/2321 |
| 2020/0334557 A1* | 10/2020 | Kale | G06N 20/00 |
| 2020/0336597 A1* | 10/2020 | Haltom | H04M 3/42059 |
| 2020/0341987 A1* | 10/2020 | Wright | G06N 20/00 |
| 2020/0342113 A1* | 10/2020 | Yi | G06F 16/2379 |
| 2020/0349641 A1* | 11/2020 | Fidanza | G06N 20/00 |
| 2020/0356675 A1* | 11/2020 | Shakarian | G06F 11/008 |
| 2020/0357030 A1* | 11/2020 | Wagner | G06F 9/54 |
| 2020/0364723 A1* | 11/2020 | Gitlevich | G06Q 30/0281 |
| 2020/0372154 A1* | 11/2020 | Bacher | H04L 41/147 |
| 2020/0372399 A1* | 11/2020 | Lee | G06F 16/94 |
| 2020/0380387 A1* | 12/2020 | Pourmohammad | F24F 11/30 |
| 2020/0394542 A1* | 12/2020 | Buesser | G06F 18/29 |
| 2020/0401522 A1* | 12/2020 | Xu | G06F 12/0862 |
| 2020/0409780 A1* | 12/2020 | Balasubramanian | G06F 9/547 |
| 2020/0409822 A1* | 12/2020 | Balasubramanian | G06F 11/302 |
| 2020/0409825 A1* | 12/2020 | Balasubramanian | G06F 11/302 |
| 2021/0012235 A1* | 1/2021 | Abbas | H04L 69/22 |
| 2021/0019376 A1* | 1/2021 | Neubauer | G08G 1/081 |
| 2021/0027065 A1* | 1/2021 | Chung | G06N 20/00 |
| 2021/0034602 A1* | 2/2021 | Levacher | G06F 16/122 |
| 2021/0042168 A1* | 2/2021 | Bakulin | G06F 8/36 |
| 2021/0042587 A1* | 2/2021 | Vitkin | G06F 18/21 |
| 2021/0064934 A1* | 3/2021 | Swaminathan | G06N 20/00 |
| 2021/0075814 A1* | 3/2021 | Bulut | H04L 63/102 |
| 2021/0089963 A1* | 3/2021 | Baek | H04L 67/63 |
| 2021/0090736 A1* | 3/2021 | Innanje | G16H 40/63 |
| 2021/0097339 A1* | 4/2021 | Agrawal | G06F 17/18 |
| 2021/0103991 A1* | 4/2021 | Kern | G06N 20/00 |
| 2021/0110288 A1* | 4/2021 | Poothiyot | G06F 8/20 |
| 2021/0118117 A1* | 4/2021 | Albrecht | G06V 10/764 |
| 2021/0126952 A1* | 4/2021 | Llamas Virgen | H04L 63/205 |
| 2021/0133600 A1* | 5/2021 | Elewitz | G06N 3/08 |
| 2021/0133961 A1* | 5/2021 | Itu | G06N 20/00 |
| 2021/0141834 A1* | 5/2021 | MacManus | G06F 16/906 |
| 2021/0142000 A1* | 5/2021 | Vis | G06F 40/169 |

(56) References Cited

U.S. PATENT DOCUMENTS

| | | |
|---|---|---|
| 2021/0146241 A1* | 5/2021 | Bleasdale-Shepherd ................... G06N 20/00 |
| 2021/0157926 A1* | 5/2021 | Handurukande ...... G06N 20/20 |
| 2021/0166151 A1* | 6/2021 | Kennel ................... G06F 17/18 |
| 2021/0173825 A1* | 6/2021 | Lu ........................ G06F 16/2365 |
| 2021/0174238 A1* | 6/2021 | Song ...................... G06N 20/00 |
| 2021/0176261 A1* | 6/2021 | Yavo ................... H04L 63/1433 |
| 2021/0181754 A1* | 6/2021 | Cui .................... B60W 60/0011 |
| 2021/0182830 A1* | 6/2021 | Edwards ................ G06N 20/00 |
| 2021/0182877 A1* | 6/2021 | Horesh ................. G06N 20/00 |
| 2021/0182878 A1* | 6/2021 | Margolin ........... G06Q 30/0201 |
| 2021/0200870 A1* | 7/2021 | Yavo ........................ G06N 5/04 |
| 2021/0201400 A1* | 7/2021 | Liu ......................... G06Q 40/03 |
| 2021/0216643 A1* | 7/2021 | Mishra .................. G06F 21/572 |
| 2021/0232472 A1* | 7/2021 | Nagaraj .............. H04L 43/0876 |
| 2021/0234833 A1* | 7/2021 | Schneider ................ G06N 3/08 |
| 2021/0248503 A1* | 8/2021 | Hickey ............... G06F 18/2113 |
| 2021/0257067 A1* | 8/2021 | Yabuuchi ................. G06N 5/04 |
| 2021/0263978 A1* | 8/2021 | Banipal .................. G06N 20/00 |
| 2021/0271956 A1* | 9/2021 | Wang .................... G06F 18/217 |
| 2021/0279731 A1* | 9/2021 | Agrawal ............. G06Q 20/322 |
| 2021/0287111 A1* | 9/2021 | Zhou ....................... G06Q 10/10 |
| 2021/0294647 A1* | 9/2021 | Chu ........................ G06N 20/00 |
| 2021/0304018 A1* | 9/2021 | Usman ................ G06F 11/3409 |
| 2021/0304847 A1* | 9/2021 | Senior ..................... G06N 3/047 |
| 2021/0312541 A1* | 10/2021 | Worthington ..... G06F 18/21342 |
| 2022/0004484 A1* | 1/2022 | Markus ................ G06F 11/3692 |
| 2022/0027465 A1* | 1/2022 | Hercock .............. G06N 3/0454 |
| 2022/0027477 A1* | 1/2022 | Hercock .............. G06F 21/577 |
| 2022/0027478 A1* | 1/2022 | Hercock .............. G06F 21/554 |
| 2022/0057365 A1* | 2/2022 | Claudio ............. G01N 33/2045 |
| 2022/0057367 A1* | 2/2022 | Claudio ................... G06N 5/01 |
| 2022/0092651 A1* | 3/2022 | Sureshkumar .......... G06F 40/30 |
| 2022/0164071 A1* | 5/2022 | Choi ..................... G06F 3/0481 |
| 2022/0198372 A1* | 6/2022 | Brahmachary .... G06Q 10/0631 |

FOREIGN PATENT DOCUMENTS

| | | |
|---|---|---|
| WO | 2017152742 A1 | 9/2017 |
| WO | 2018073711 A1 | 4/2018 |
| WO | 2019089389 A1 | 5/2019 |

OTHER PUBLICATIONS

Sonnekalb "Machine-Learning Supported Vulnerability Detection in Source Code," 2019, pp. 1180-1183 (Year: 2019).*
Lamichhane et al. "A Quantitative Risk Analysis Model and Simulation of Enterprise Networks," pp. 844-850 (Year: 2018).*
Copeland etal "Identifying Risk Profiles and Mitigating Actions for Business Communication Services," 10th CNSM and Workshop, CNSM Mini Conference Paper, pp. 236-241 (Year: 2014).*
Alsaleh et al "Optimizing the RoI of Cyber Risk Mitigation," CNSM Short Paper, pp. 223-227, (Year: 2016).*
Sanders et al "Correlating Risk Findings to Quantify Risk," 2012 ASE/IEEE International Conference on Social Computing and 2012 ASE/IEEE International Conference on Privacy, Security, Risk and Trust, IEEE Computer Society, pp. 752-759 (Year: 2012).*
Blog > Vulnerability Management > Make Your Vulnerability Management Count Aboud Jun. 19, 2019 4 pages.
Improving Vulnerability Remediation Through Better Exploit Prediction Jacobs et al. 29 pages.
New From Wallarm Research: First AI-based Tool to Predict Vulnerability Risk 6 pages.
The Daily Swing Open Source Tool Predicts Which Security Vulnerabilities Are Most Likely to be Exploited 3 pages.
Watch Machine Learning (ML) Powered Vulneraability Scoring for Better Priorization Apr. 26, 2019 Borkar 5 pages.
Jun. 29, 2021—(WO) International Search Report & Written Opinion—PCT/US21/26109.

* cited by examiner

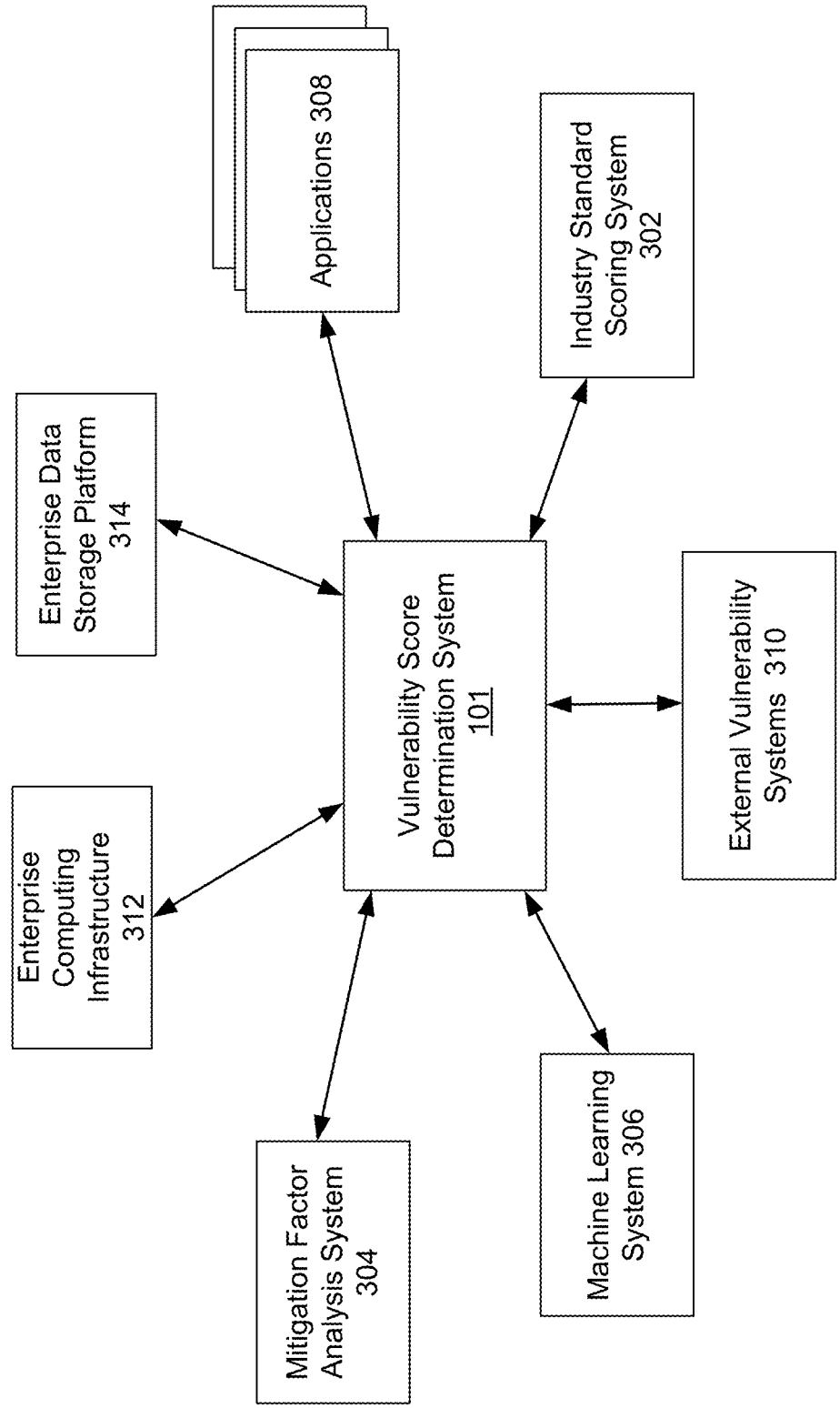

MACHINE LEARNING SYSTEM FOR DETERMINING A SECURITY VULNERABILITY IN COMPUTER SOFTWARE

FIELD OF ART

Aspects of the disclosure generally relate to methods and computer systems, including one or more computers particularly configured and/or executing computer software. More specifically, aspects of this disclosure relate to machine learning systems for determining a security vulnerability in computer software.

BACKGROUND

Identifying security vulnerabilities in computer software and determining a severity level of an associated risk has become a priority, especially with a rise in dependence on computing infrastructure. Generally, a breach associated with a vulnerability may lead to loss of wealth, personal or private information, data, and so forth. When such vulnerabilities are not mitigated in a timely manner, businesses may incur increased losses.

Vulnerability data is inherently difficult to understand because of a variety of factors that may influence a security vulnerability. Measuring risk in a system may be difficult as well. Organizations may be different and have various internal units, goals, policies, budgets, and so forth, making it difficult to design a system to detect vulnerabilities for different organizations. A system may not be able to detect organizational variables, or be sensitive to changes in such variables. A vulnerability may be a high risk vulnerability in one organization, and may be a low risk vulnerability in another organization, for example, based on mitigation factors that may reduce the risk. Generally, risk scores are agnostic to an organization's infrastructure or what the organization may be doing to mitigate the risk. Some computing environments may be more vulnerable. For example, if a computing environment of an organization is external facing, then it may be more vulnerable. On the other hand, if a computing environment of an organization is internal facing, then it may be less vulnerable.

It may be difficult for organizations to understand their overall risk exposure given known and/or unknown security vulnerabilities that may exist in their technology environments. Although organizations may be able to determine baseline risk scores, this may not provide an understanding of a degree to which mitigation efforts are successful in reducing the risk. Accordingly, systems and methods described herein may enable an organization to use machine learning to assess risk exposure, and assess how well mitigating controls may be reducing the baseline calculated risk score.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer readable storage media, software, systems, and apparatuses for machine learning systems for determining vulnerability based on a mitigating factor. In particular, based on a type of mitigation applied to a vulnerability by an enterprise organization, an enterprise risk score may be determined.

In some aspects, a vulnerability score determination system may include at least one processor and a memory unit storing computer-executable instructions. In some embodiments, the computer-executable instructions may be stored in one or more non-transitory computer-readable media. The vulnerability score determination system may be configured to, in operation, retrieve, from an industry standard setting scoring system and for a vulnerability, a temporal score based on a pre-revision version of a scoring system. The vulnerability score determination system may predict, based on a machine learning model and the temporal score based on the pre-revision version of the scoring system, an updated temporal score based on a post-revision version of the scoring system. The vulnerability score determination system may, in operation, determine, for the vulnerability, a mitigating factor score, where the mitigating factor score is indicative of a mitigation applied to the vulnerability by an enterprise organization. The vulnerability score determination system may, in operation, generate, for the vulnerability, a risk score, where the risk score is a composite of the updated temporal score and the mitigating factor score. The vulnerability score determination system may, in operation, determine, based on the risk score for the vulnerability; an enterprise risk score for the enterprise organization, where the enterprise risk score is an aggregate of risk scores for vulnerabilities in a collection of vulnerabilities, and where the collection of vulnerabilities is indicative of vulnerabilities associated with the enterprise organization. The vulnerability score determination system may be configured to, in operation, display, via a graphical user interface, the enterprise risk score.

In other aspects, the vulnerability score determination system may also be configured to, in operation, determine (1) an effectiveness measure indicative of a success of the mitigation, (2) a completeness measure indicative of a percentage of total enterprise assets that the mitigation has been applied to, and (3) an enforcement measure indicative of a success in enforcing the mitigation. In some aspects, vulnerability score determination system may be configured to determine the mitigating factor score by determining a combination of the effectiveness measure, the completeness measure, and the enforcement measure.

In some aspects, the vulnerability score determination system may, in operation, apply a first weight to the effectiveness measure, apply a second weight to the completeness measure, and apply a third weight to the enforcement measure. In some aspects, vulnerability score determination system may be configured to determine the combination of the effectiveness measure, the completeness measure, and the enforcement measure by determining a weighted combination based on the first weight, the second weight, and the third weight.

In some aspects, the vulnerability score determination system may, in operation, determine the enforcement measure by determining whether the mitigation may be automatically rolled out to all enterprise assets.

In other aspects, the vulnerability score determination system may, in operation, determine the enforcement measure by determining whether the enforcing of the mitigation may be prevented.

In some aspects, the vulnerability score determination system may, in operation, determine the enforcement measure by determining whether the applying of the mitigation is reversible.

In some aspects, the risk score may be based on an additive relationship between the updated temporal score and the mitigating factor score.

In other arrangements, the risk score may be based on a product of the updated temporal score and an exponential decay value of the mitigating factor score.

In other aspects, the risk score may be based on an additive relationship between the updated temporal score and an exponential decay value of the mitigating factor score.

In some aspects, the machine learning model may utilize a gradient boosting technique.

In other aspects, the vulnerability score determination system may, in operation, train the machine learning model to predict the updated temporal score.

Methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which:

FIG. 3 shows a block diagram illustrating system architecture for a vulnerability score determination system in accordance with one or more aspects described herein.

DETAILED DESCRIPTION

In accordance with various aspects of the disclosure, methods, computer-readable media, software, and apparatuses are disclosed for determining vulnerability based on a mitigating factor. As described herein, risk scores may be associated with each vulnerability, and the risk score may be adjusted based on mitigating factors applied to the vulnerability. As different organizations may apply different mitigating factors to the same vulnerability, the risk scores may be different for different organizations. Also, for example, senior executives of an organization may be interested in a composite score that reflects an aggregate risk for software vulnerabilities facing the enterprise organization.

Generally, vulnerability management may focus on identifying, classifying, remediating, and mitigating vulnerabilities in software products. Risk management generally focuses on identifying, forecasting, and evaluating risks to an enterprise organization. In general, these approaches may be different, and different groups within an organization may perform such activities, and in some instances, independently of each other. However, the systems described herein provide an effective way to combine the two approaches resulting in an enterprise risk score based on an evaluation of software vulnerabilities. As described herein, an overall risk to an organization based on the security vulnerabilities facing the organization may be determined. Also, for example, a reduced risk score may be determined that may be indicative of mitigating controls that have been put in place in the organization. Machine models may be utilized to approximate the risk score of an enterprise. An aggregate risk score may be determined for the organization, thereby enabling executives to quickly assess risk in the organization.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
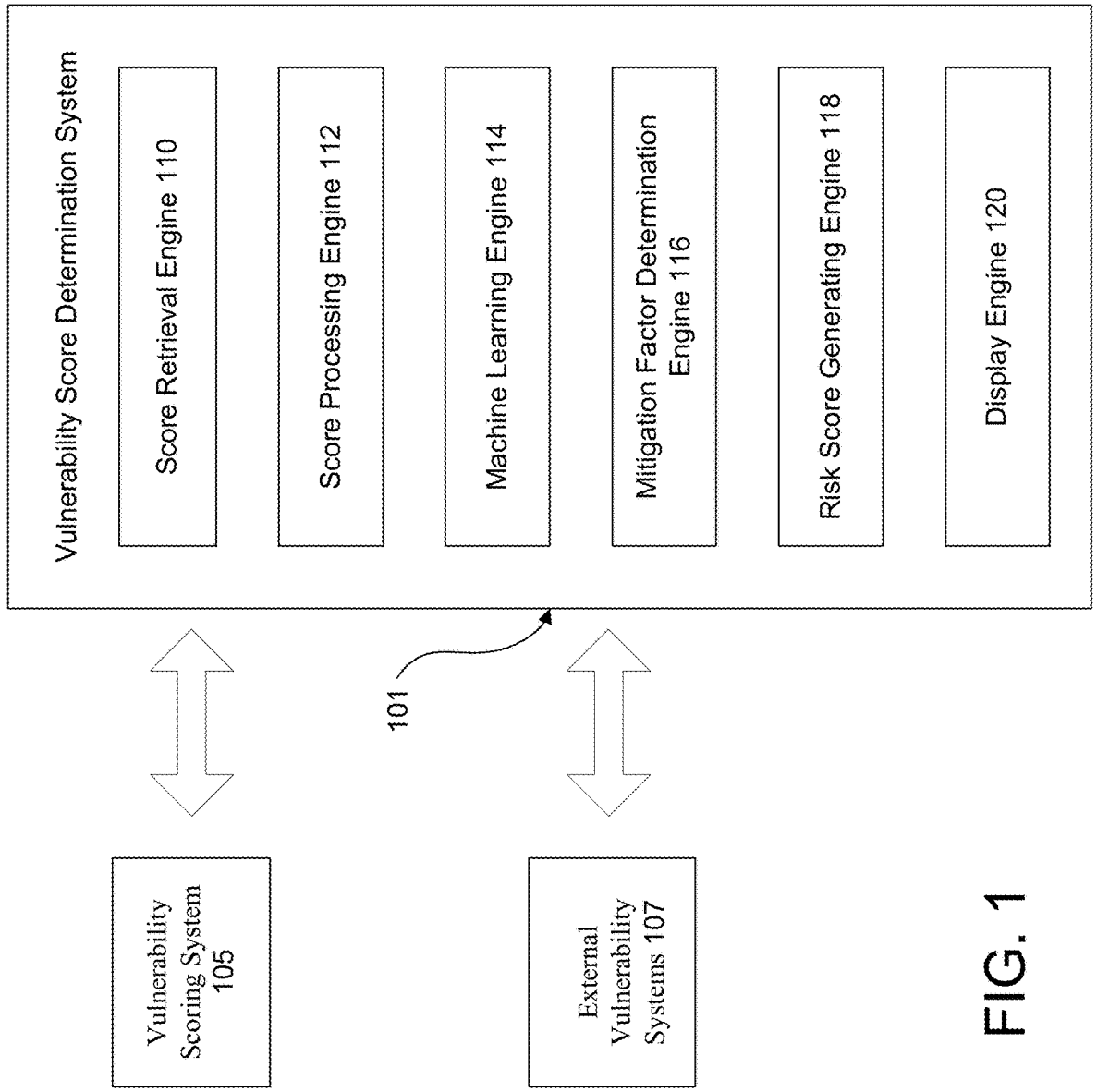
FIG. 1 illustrates a block diagram for a vulnerability score determination system in accordance with one or more aspects described herein.

FIG. 1 illustrates a block diagram for a vulnerability score determination system in accordance with one or more aspects described herein. As shown in FIG. 1, the vulnerability score determination system 101 may communicate with vulnerability scoring system 105 to retrieve, for a vulnerability, a temporal score based on a pre-revision version of a scoring system. In some embodiments, vulnerability score determination system 101 may communicate with external vulnerability systems 107 to monitor information related to security threats and vulnerabilities.

In some embodiments, vulnerability score determination system 101 may comprise a score retrieval engine 110, score processing engine 112, machine learning engine 114, mitigation factor determination engine 116, risk score generating engine 118, and display engine 120. Although score retrieval engine 110, score processing engine 112, machine learning engine 114, mitigation factor determination engine 116, risk score generating engine 118, and display engine 120 are shown as separate elements from vulnerability score determination system 101, one or more of them may be within the same structure.

The score retrieval engine 110 may be configured to retrieve for a vulnerability, a temporal score based on a pre-revision version of a scoring system from a vulnerability scoring system 105. The term "vulnerability" as used herein, may generally refer to a security weakness in a computing environment that may be potentially exploited to access the computing environment in an unauthorized manner. For example, the security weakness may result in an unauthorized access to confidential information (e.g., account information from financial institutions and/or insurance providers). In some instances, the security weakness may be caused by a software product installed within the computing environment. For example, computing infrastructure in enterprise organizations (e.g., enterprise computing infrastructure 212) may host a variety of software for word processing, electronic mail communications, telephone and/or video communications, workflow management software, human resource software, travel software, and so forth. Such software products may include portions of code that may be leveraged to access the computing environment.

Organizations that provide software products may update the products to fix bugs and patch vulnerabilities. In some instances, such activity may be performed as a matter of routine. For example, software companies may test their products for potential weaknesses and develop and/or modify the software code to mitigate such weaknesses. In some instances, software companies may modify their products in response to a security breach of a computing environment.

Enterprise organizations such as financial institutions and/or insurance providers typically store and/or process large amounts of confidential information, including, for example, personal information for customers, financial data and information, accident information, medical records, litigation related documents, and so forth. Also, for example, enterprise organizations may deploy a large number of software products to provide their services. Accordingly, identifying, managing, and/or mitigating vulnerabilities may be of significant interest to the enterprise organization, so as to effectively protect customer and employer data.

Accordingly, in many instances, vulnerabilities may pose a significant risk to an enterprise organization. Such risk may relate to tangible and intangible business risks, risks related to an actual breach leading to loss of secured data, and/or risks related to potential financial losses, risks associated with compliance with laws and regulations, and so forth. In an effort to identify the risk from a vulnerability, it may be advantageous to determine a risk level for each vulnerability. In some embodiments, score retrieval engine 110 may be configured to determine a temporal score based on one or more metrics. In an effort to incorporate industry standards into a scoring framework, in some embodiments, score retrieval engine 110 may be configured to retrieve the temporal score from an industry standard setting organization, such as, for example, temporal scores provided by CVSS, which provide a baseline indication of a risk level associated with a vulnerability.

The CVSS scores are generally available in two versions. Version 2 (CVSS V2), referred to herein as the pre-revision version, includes a base metric group (comprising an access vector, an access complexity, an authentication, a confidentiality impact, an integrity impact, and an availability impact), a temporal metric group (comprising an exploitability, a remediation level, and a report confidence), and an environmental metric group (comprising a collateral damage potential, a target distribution, a confidentiality requirement, an integrity requirement, and an availability requirement). These factors may be utilized to determine a base score for each vulnerability, as illustrated herein (see, generally, https://en.wikipedia.org/wiki/Common_Vulnerability_Scoring_System (last visited Mar. 18, 2020)):

$$\text{Exploitability}=20*\text{AccessVector}*\text{AccessComplexity}*\text{Authentication} \quad \text{(Eqn. 1)}$$

$$\text{Impact}=10.41*(1-(1-\text{ConfImpact})*(1-\text{IntegImpact})*(1-\text{AvailImpact})), \text{ where ConfImpact is an impact metric related to confidentiality, IntegImpact is an impact metric related to integrity, and Availability is an impact metric related to availability.} \quad \text{(Eqn. 2)}$$

$$f(\text{Impact}) = \begin{cases} 0 & \text{if Impact} = 0 \\ 1.176, & \text{otherwise} \end{cases} \quad \text{(Eqn. 3)}$$

$$\text{BaseScore}=\text{roundTo1Decimal}((0.6*\text{Impact})+(0.4*\text{Exploitability})-1.5)*f(\text{Impact})) \quad \text{(Eqn. 4)}$$

The temporal score may be an adjusted base score. For example, the base score may be a severity assessment score, and the temporal score may be the base score updated with information such as whether the vulnerability has been utilized in a cyberattack. In one embodiment, if the vulnerability has been utilized in a cyberattack, then the base score may be increased. The severity of the cyberattack may determine a multiplying factor for the base score to determine the temporal score. In another embodiment, if the vulnerability has been utilized in a cyberattack, then the base score may be decreased. For example, if the vulnerability is deployed and has not been exploited, then a lower risk may be associated with the vulnerability. Accordingly, the base score may be decreased to determine the temporal score. For example, the temporal score may be determined as:

$$\text{TemporalScore}=\text{roundTo1Decimal}(\text{BaseScore}*\text{Exploitability}*\text{RemediationLevel}*\text{ReportConfidence}) \quad \text{(Eqn. 5)}$$

In some embodiments, the temporal score may be the base score updated with information such as how long the vulnerability has been deployed. For example, if the vulnerability has been deployed for a time greater than a predetermined first threshold, and no security breaches have occurred, this may indicate that a lower risk may be associated with the vulnerability. Accordingly, the base score may be decreased to determine the temporal score. As another example, if the vulnerability has been deployed for a time less than a predetermined second threshold, this may indicate that a higher risk may be associated with the vulnerability. Accordingly, the base score may be increased to determine the temporal score. In some instances, the predetermined first and/or second threshold may depend on the vulnerability, and/or the enterprise organization.

In another embodiment, the temporal score may be the base score updated with information such as whether exploit code is available. For example, some software codes may include portions of code that may be more accessible to cyberattacks. Presence or absence of such exploit codes may determine a level of risk. Accordingly, if the vulnerability is associated with a presence of an exploit code, this may indicate that a higher risk may be associated with the vulnerability. The base score may then be increased to determine the temporal score. As another example, if the vulnerability is not associated with a presence of an exploit code, this may indicate that a lower risk may be associated with the vulnerability. The base score may then be decreased to determine the temporal score.

Generally, an updated temporal score may be a numeral between 1 (e.g., indicative of a low concern), and 10 (e.g., indicative of a critical concern), that may be assigned to each vulnerability. In some instances, the scoring may be based on input from researchers and publishers of the vulnerable software. The updated version accounts for intrinsic characteristics of each vulnerability, along with a current state of the published software code to exploit the vulnerability, and available patches.

The score processing engine 112 may determine, for the vulnerability, an updated temporal score based on a post-revision version of the scoring system. An updated version, Version 3 (CVSS V3), of the CVSS score, referred to herein as the post-revision version, updates the scores based on the pre-revision version. For example, a standard setting organization (e.g., NIST) may determine an amount of time to be taken for a patch to be released for a vulnerability in a software code. However, the standard setting organization may not base the temporal score on an actual amount of time taken for the patch to be released. Accordingly, score processing engine 112 may determine the time taken for the patch to be released to determine the updated temporal score. For example, if the time taken for the patch to be released is greater than a predetermined threshold, this may indicate that a higher risk may be associated with the vulnerability. Accordingly, the base score may be decreased to determine the updated temporal score. As another example, if the time taken for the patch to be released is less than another predetermined threshold, this may indicate that a higher risk may be associated with the vulnerability. Accordingly, the base score may be increased to determine the updated temporal score.

Many earlier-known vulnerabilities (e.g., known prior to 2012) are not associated with an updated score based on the updated version of the scoring system. Also, for example, equations and ratings for calculating scores based on the pre-revision version are different from calculating scores based on the post-revision version.

Machine learning engine 114 may learn to convert the temporal score based on the pre-revision version of the scoring system to the updated temporal score based on a post-revision version of the scoring system. For example, for many vulnerabilities, both the temporal score based on the pre-revision version of the scoring system and the updated temporal score based on a post-revision version of the scoring system are available. Accordingly, such data may be utilized as labeled training data for the machine learning model.

For example, a machine learning model may be configured to include the scoring factors and underlying formulas (e.g., Eqns. 1-5) associated with the pre-revision version (CVSS V2) and the post-revision version (CVSS V3) scores. Also, for example, the machine learning model may be configured to learn, based on training data for vulnerabilities for which a pre-revision version (CVSS V2) and a post-revision version (CVSS V3) score are available, the differences between the two scoring versions. For example, the machine learning model may be configured to learn the factors that have been updated between the two versions. As another example, the machine learning model may be configured to learn a manner in which a first set of formulas (applied to the pre-revision version score) is transformed to a second set of formulas (applied to the post-revision version score). Based on such learning, machine learning engine 114 may apply the trained machine learning model to determine updated temporal scores (e.g., predicted post-revision version scores) from the pre-revision version scores.

For example, Access Vector from the pre-revised version has been renamed to Attack Vector in the post-revision version. Also, for example, impact metrics for confidentiality, integrity, and availability have been updated. As another example, a metric value for Physical has been included in the impact metric for Attack Vector, where the metric value for Physical is indicative of vulnerabilities that require physical access to a device or a system to perform. The machine learning model may be configured to automatically apply such changes to the pre-revision version scores. The terms "Access Vector," "Attack Vector," and "Physical", are terms of art and, as used herein, will be readily understood by those having ordinary skill in the art.

In some embodiments, the updated temporal score may be based on a gradient boosting technique. For example, an extreme gradient boosting (XGBoost) regression technique, a stochastic gradient boosting technique, or a regularized gradient boosting technique may be utilized. Generally, an XGBoost algorithm may be based on gradient boosted decision trees, and may be applied to structured or tabular data. For example, in an XGBoost regression technique, an input may be a temporal score based on the pre-revision version (CVSS V2) of the CVSS scoring system, and an output may be the updated temporal score, based on the post-revision version (CVSS V3), as a numeral between 0 and 10.

In some embodiments, the input may be a vector string. The CVSS V2 vector string may have a label "CVSS:" and a numeric representation of the version, "2.0." Metric information may follow in the form of a set of metrics, each metric being preceded by a forward slash, "/", acting as a delimiter. Each metric may have a metric name in abbreviated form, a colon, ":", and its associated metric value in abbreviated form. For example, a vector string for a CVSS V2 vector may be <CVSS:2.0/AV:A/AC:H/Au:N/C:P/I:N/A:P/E:U/RL:OF/RC:C>, with weights associated with one or more metric values in the vector string.

In some example implementations, a dataset including a large number (e.g., 15244 in one instance) of vulnerabilities labeled with both CVSS V2 vector string and a CVSS V3 temporal score may be utilized as a training set. In some embodiments, a 5-fold cross validation may be performed based on for example the root mean square error (RMSE) or the mean absolute error (MAE).

Mitigation factor determination engine 116 may determine, for the vulnerability, a mitigating factor score, where the mitigating factor score is indicative of a mitigation applied to the vulnerability by an enterprise organization. Generally, the updated temporal score is indicative of a severity of a vulnerability. However, the updated temporal score may not be based on mitigations that may be applied to the vulnerability. In some instances, different mitigation strategies may be applied to vulnerabilities. Also, for example, the mitigation strategy may be based on the enterprise organization. For example, a risk appetite of an organization may determine its mitigation strategies. As another example, laws and regulations of a jurisdiction in which the organization operates may indicate a type of mitigation applied by the organization. Generally, the mitigation factor score may indicate such organizational factors that may influence a risk assessment. In some embodiments, the mitigation factor score may be a numeral scaled score between 1 and 5, where a score of 1 may indicate an absence of a mitigation, and a score of 5 may indicate a high level of mitigation. In some instances, the mitigation factor score may be based on domain knowledge and/or results of an analysis by a vulnerability management research team in an organization.

In some embodiments, mitigation factor determination engine 116 may determine an effectiveness measure indicative of a success of the mitigation, a completeness measure indicative of a percentage of total enterprise assets that the mitigation has been applied to, and an enforcement measure indicative of a success in enforcing the mitigation. For example, for a given vulnerability, mitigation factor determination engine 116 may determine whether there is an effective way to reduce risk. Upon a determination that there is no effective way to reduce risk, mitigation factor determination engine 116 may infer that there is no mitigating factor. On the other hand, upon a determination that there is an effective way to reduce risk, mitigation factor determination engine 116 may determine a degree of completeness of the mitigation.

For example, mitigation factor determination engine 116 may determine if the mitigation may prevent a hacker from exploiting the vulnerability, or if the mitigation may make it more difficult for the hacker to exploit the vulnerability. In some embodiments, mitigation factor determination engine 116 may determine the completeness measure by determining a percentage of total enterprise assets that the mitigation has been applied to. For example, based on a type of vulnerability, and/or a type of enterprise organization, a threshold for the percentage may be determined, and the completeness measure may be based on a comparison of the percentage of total enterprise assets that the mitigation has been applied to, to this threshold percentage. For example, a large computing environment with a large number of network devices and/or a large number of deployed software, may be associated with a lower threshold percentage.

For example, a large computing environment with thousands of network devices may be associated with a threshold percentage of 65%. Accordingly, if the percentage of total enterprise assets that the mitigation has been applied to is greater than 65%, then the completeness measure may be determined to be high. Also, for example, if the percentage of total enterprise assets that the mitigation has been applied to is less than 65%, then the completeness measure may be determined to be low.

As another example, a smaller computing environment with a smaller number of network devices may be associated with a higher threshold percentage of 95%. Accordingly, if the percentage of total enterprise assets that the mitigation has been applied to is greater than 95%, then the completeness measure may be determined to be high. Also, for example, if the percentage of total enterprise assets that the mitigation has been applied to is less than 95%, then the completeness measure may be determined to be low.

In some examples, a type of the organization may determine the threshold percentage. For example, financial institutions and/or insurance providers may have a low tolerance for risk, and may set a high threshold for the percentage in a determination of the completeness measure.

In some embodiments, mitigation factor determination engine 116 may determine the mitigating factor score by determining a combination of the effectiveness measure, the completeness measure, and the enforcement measure. For example, for a given vulnerability, the effectiveness measure may be 2, the completeness measure may be 4, and the enforcement measure may be 4. Accordingly, mitigation factor determination engine 116 may determine the mitigation factor to be 10 by computing a sum of the scores. In some embodiments, mitigation factor determination engine 116 may determine the mitigation factor to be 3.33 by computing an average of these scores.

In some embodiments, mitigation factor determination engine 116 may apply a first weight to the effectiveness measure, apply a second weight to the completeness measure, and apply a third weight to the enforcement measure. In some embodiments, mitigation factor determination engine 116 may determine the combination of the effectiveness measure, the completeness measure, and the enforcement measure by determining a weighted combination based on the first weight, the second weight, and the third weight. For example, for a given vulnerability, the effectiveness measure may be 2 with a first weight of 0.2, the completeness measure may be 4 with a second weight of 0.5, and the enforcement measure may be 4 with a third weight of 0.3. Accordingly, mitigation factor determination engine 316 may determine the mitigation factor by computing a weighted average of these scores and determine the mitigating factor score to be 0.2*2+0.5*4+0.3*4=3.6.

In some embodiments, mitigation factor determination engine 116 may determine the enforcement measure by determining whether the mitigation may be automatically rolled out to all enterprise assets. For example, if the mitigation may be automatically rolled out to all enterprise assets, then this may indicate a high level of mitigation. Accordingly, the enforcement measure may be associated with a high numeric score. Also, for example, if the mitigation may not be automatically rolled out to all enterprise assets, then this may indicate a lower level of mitigation. Accordingly, the enforcement measure may be associated with a lower numeric score. For example, for some vulnerabilities, application owners may need to roll out the mitigation manually.

In some embodiments, mitigation factor determination engine 116 may determine the enforcement measure by determining whether the enforcing of the mitigation may be prevented. For example, due to operational capabilities of one or more resources in a computing environment, one or more corporate policies, laws, or regulations may prevent the mitigation from being enforced. For example, if the enforcing of the mitigation may be prevented, then this may indicate a low level of mitigation. Accordingly, the enforcement measure may be associated with a lower numeric score. Also, for example, if the enforcing of the mitigation may not be prevented, then this may indicate a higher level of mitigation. Accordingly, the enforcement measure may be associated with a higher numeric score.

In some embodiments, mitigation factor determination engine 116 may determine the enforcement measure by determining whether the applying of the mitigation is reversible. For example, mitigation factor determination engine 116 may determine if developers and/or users may undo the mitigation. Also, for example, mitigation factor determination engine 116 may determine if there is a workaround to the mitigation being rolled out, if the mitigation is in place, and/or a level of confidence that the mitigation will remain in place. Accordingly, if the applying of the mitigation is reversible, then this may indicate a low level of mitigation, and the enforcement measure may be associated with a lower numeric score. Also, for example, if the applying of the mitigation is not reversible, then this may indicate a higher level of mitigation. Accordingly, the enforcement measure may be associated with a higher numeric score.

In some embodiments, mitigation factor determination engine 116 may receive inputs from analysts for more vulnerabilities. For example, mitigation factor determination engine 116 may receive ratings for the effectiveness measure, the completeness measure, and/or the enforcement measure, and mitigation factor determination engine 116 may analyze the ratings for consistency and/or validity.

Risk score generating engine 118 may generate, for the vulnerability, a risk score, where the risk score is a composite of the updated temporal score and the mitigating factor score. In some embodiments, risk score generating engine 118 may determine the risk score based on an additive relationship between the updated temporal score and the mitigating factor score. For example, the relationship may be based on:

Risk Score=Temporal Score−$k$*(Mitigating Factor Score−1), where $k$ is a parameter. (Eqn. 6)

Figure 2C:
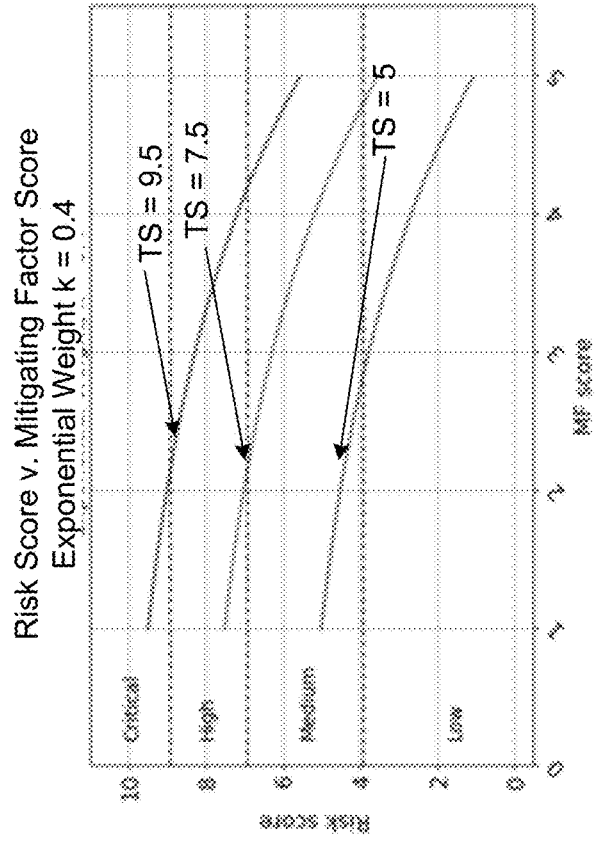
FIGS. 2A-2C illustrate example graphical representations of risk scores based on various models in accordance with one or more aspects described herein.
Figure 2A:
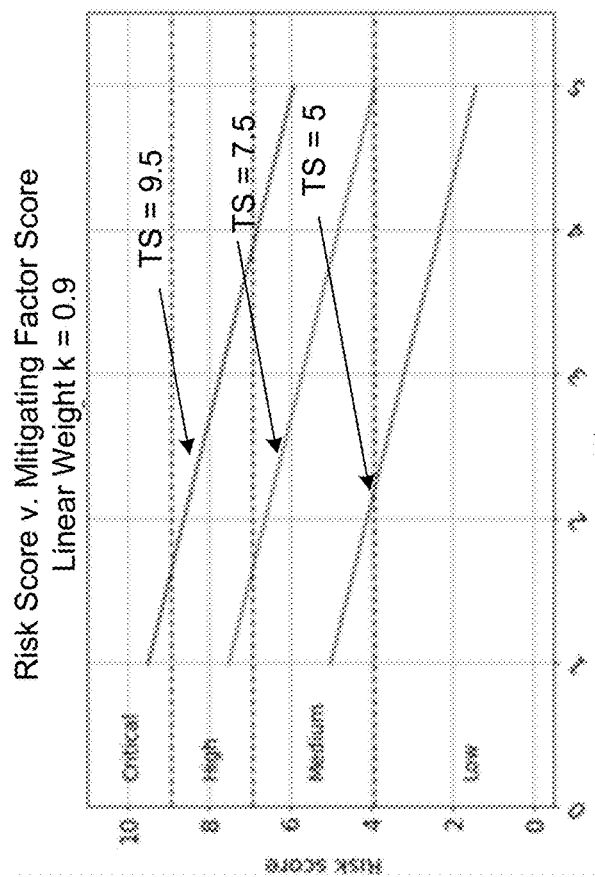
Figure 2B:
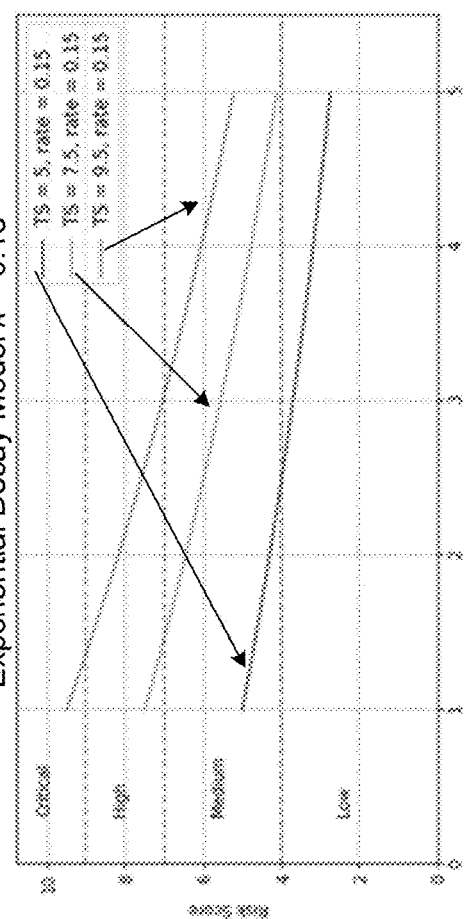

FIGS. 2A-2C illustrate example graphical representations of risk scores based on various models in accordance with one or more aspects described herein. Referring to FIG. 2A, the horizontal axis represents the mitigating factor score and the vertical axis represents the risk score. As illustrated, the risk scores are based on an additive relationship between the updated temporal score and the mitigating factor score with weight k=0.9. The graphical representation illustrates how temporal scores of 9.5, 7.5 and 5 are reduced. As illustrated, the reduction in the risk score remains constant as the mitigating factor increases.

In some embodiments, risk score generating engine 118 may determine the risk score based on a product of the updated temporal score and an exponential decay value of the mitigating factor score. For example, the relationship may be based on:

Risk Score=Temporal Score*$\exp^{-\lambda(\text{Mitigating Factor Score-1})}$, where $\lambda$ is a parameter. (Eqn. 7)

Referring now to FIG. 2B, the horizontal axis represents the mitigating factor score and the vertical axis represents the risk score. As illustrated, the risk scores are based on a product of the updated temporal score and an exponential decay value of the mitigating factor score, with an exponential decay $\lambda$=0.15. The graphical representation illustrates how temporal scores of 9.5, 7.5 and 5 are reduced. As illustrated, the reduction in the risk score increases as the mitigating factor increases.

In some embodiments, risk score generating engine 118 may determine the risk score based on an additive relationship between the updated temporal score and an exponential decay value of the mitigating factor score. For example, the relationship may be based on:

Risk Score=Temporal Score+1−$\exp^{-k(\text{Mitigating Factor Score-1})}$, where $k$ is a parameter. (Eqn. 8)

Referring now to FIG. 2C, the horizontal axis represents the mitigating factor score and the vertical axis represents the risk score. As illustrated, the risk scores are based on an additive relationship between the updated temporal score and an exponential decay value of the mitigating factor score, with an exponential weight k=0.4. The graphical representation illustrates how temporal scores of 9.5, 7.5 and 5 are reduced. As illustrated, the reduction in the risk score decreases as the mitigating factor increases.

In some embodiments, risk score generating engine 118 may determine, based on the risk score for the vulnerability, an enterprise risk score for the enterprise organization, where the enterprise risk score is an aggregate of risk scores for vulnerabilities in a collection of vulnerabilities, and where the collection of vulnerabilities is indicative of vulnerabilities associated with the enterprise organization. Vulnerability data may be inherently difficult to understand, so in order to present the data in a useful manner to business executives (e.g., upper level management, lower level management, board members, and so forth), the data may need to be provided in a succinct manner. Vulnerability data is an inherent risk in a computing environment, comprising software and/or hardware. An enterprise security team may track these vulnerabilities to protect enterprise assets. Providing a summarized view of the risk level may be beneficial to senior executives making decisions based on risk levels. Accordingly, the enterprise risk score may be representative of the aggregate risk for vulnerabilities in the collection of vulnerabilities. In some embodiments, risk score generating engine 118 may determine the enterprise risk score by a weighted aggregate of risk scores for vulnerabilities in the collection of vulnerabilities. For example, weights may be associated with each vulnerability based on a business unit, and risk score generating engine 118 may determine the enterprise risk score by applying these weights to the risk scores for the vulnerabilities.

Referring again to FIG. 1, display engine 120 may display, via a graphical user interface, the enterprise risk score. In some embodiments, display engine 120 may display the enterprise risk scores over a time interval, and illustrate a trend in the enterprise risk scores. In some embodiments, the display may be an interactive display. For example, display engine 120 may configure the display to be interactive. For example, the display may be configured to receive user input and provide additional details related to the enterprise risk score, such as, for example, a list of vulnerabilities with high updated temporal scores, a list of vulnerabilities with high mitigation scores, and so forth.

Figure 4:
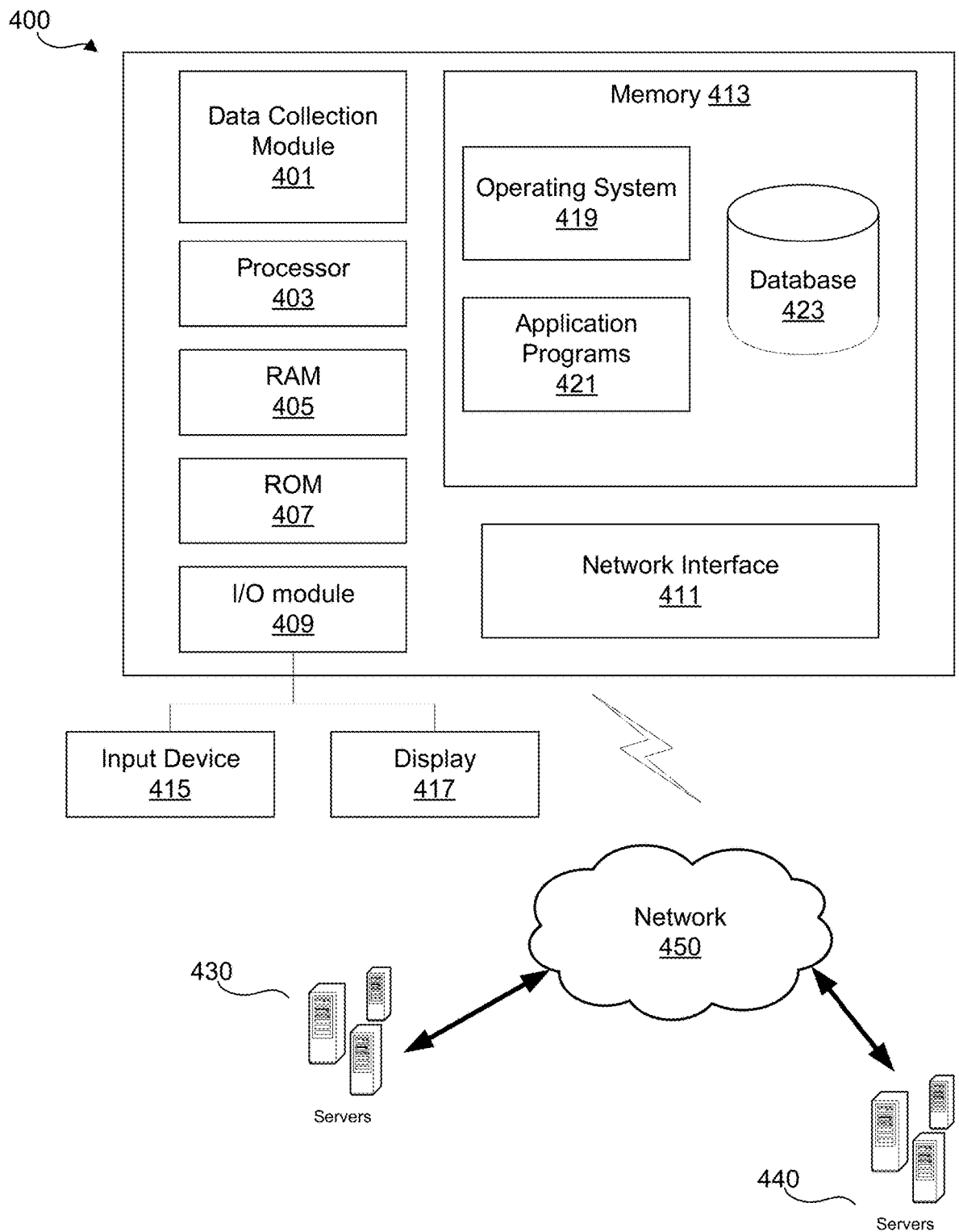
FIG. 4 illustrates an example computing environment to determine a security vulnerability in computer software in accordance with one or more aspects described herein.

FIG. 3 shows a block diagram illustrating system architecture 300 for a vulnerability score determination system 101 in accordance with one or more aspects described herein. A vulnerability score determination system 101 may retrieve, from an industry standard scoring system 302 (e.g., Common Vulnerability Scoring System (CVSS)), a temporal score for each vulnerability based on a pre-revision version of a scoring system. In some instances, the vulnerability score determination system 101 may be or include one or more components discussed with respect to a vulnerability score determination device 400, as shown in FIG. 4. In some instances, vulnerability score determination system 101 may be configured into the information technology infrastructure in different enterprise organizations. A computing device may be equipped with vulnerability score determination system 101 to perform the processes described herein, and may be equipped to communicate with devices, servers, databases, etc. over a network. In some embodiments, vulnerability score determination system 101 may collect information from and transmit information to each of the various applications, databases, devices, and backend servers described in FIG. 3.

Mitigation factor analysis system 304 may be configured to determine, for each vulnerability and for each enterprise organization, one or more mitigations applied to the vulnerability. For example, different organizations may respond differently to the same vulnerability. Accordingly, a risk factor may vary based on a type of mitigation applied, and mitigation factor analysis system 304 may be configured to analyze a type of mitigation applied to the vulnerability, and a strength and/or durability of the mitigation. Also, for example, different enterprise organizations may manage risk in different ways, and such management policies may be reflected in their respective mitigation factors. For example, some enterprise organizations may manage cybersecurity risk and promote a defense-in-depth security posture. Such organizations may have robust mechanisms to manage vulnerabilities. Accordingly, mitigation factor analysis system 304 may assign a high mitigation factor with these organizations, thereby reducing their risk score.

Machine learning system 306 may be configured to train a machine learning model to convert temporal scores based on the pre-revision version to temporal scores based on the post-revision version. For example, machine learning system 306 may be configured to learn the modifications to the pre-revision version, and predict temporal scores based on the post-revision version of the scoring system.

Applications 308 may be configured to determine a mitigating factor score, where the mitigating factor score is indicative of a mitigation applied to the vulnerability by the enterprise organization. For example, applications 308 may determine an effectiveness measure indicative of a success of the mitigation. As another example, applications 308 may determine a completeness measure indicative of a percentage of total enterprise assets that the mitigation has been applied to. Also, for example, applications 308 may determine an enforcement measure indicative of a success in enforcing the mitigation.

In some embodiments, applications 308 may determine a risk score based on an additive relationship between the updated temporal score and the mitigating factor score, a risk score based on a product of the updated temporal score and an exponential decay value of the mitigating factor score, and/or a risk score based on an additive relationship between the updated temporal score and an exponential decay value of the mitigating factor score.

External vulnerability systems 310 may include systems that monitor, analyze, and otherwise manage security vulnerabilities. In some examples, external vulnerability systems 310 may include systems associated with one or more risk scoring servers (e.g., Common Vulnerability Scoring System (CVSS) database), and/or systems associated with one or more vulnerability servers (e.g., National Vulnerability Database (NVD), Open Source Vulnerability Database, cybersecurity frameworks provided by the National Institute of Standards and Technology (NIST), and/or the Computer Emergency Response Team (CERT) Coordination Center Database).

Enterprise computing infrastructure 312 may be configured to host, execute, manage, and/or otherwise provide a computing platform for various computing devices and/or enterprise applications. In some instances, enterprise computing infrastructure 312 may be configured to provide various enterprise and/or back-office computing functions for an enterprise organization, such as an insurance organization, a financial institution, and so forth. For example, enterprise computing infrastructure 312 may include various servers that host applications that maintain, support, process, and/or provide information associated with security vulnerabilities. Additionally, or alternatively, enterprise computing infrastructure 312 may receive instructions from vulnerability score determination system 101 and execute the instructions in a timely manner.

Enterprise data storage platform 314 may be configured to store and/or otherwise manage data, including information associated with a vulnerability, such as scoring systems, algorithms, metrics, and/or formulas provided by the industry standard scoring system 302, mitigation factor analysis system 304, external vulnerability systems 310, application data from applications 308, and/or data otherwise provided by enterprise computing infrastructure 312. Also, for example, enterprise data storage platform 314 may be configured to store and/or otherwise maintain information associated with security vulnerabilities, such as, for example, a type, source, severity, scope, and so forth. For example, enterprise data storage platform 314 may be configured to store and/or otherwise maintain information related to security vulnerabilities, such as from online resources, including, but not limited to Common Vulnerability Scoring System (CVSS) database, National Vulnerability Database (NVD), Open Source Vulnerability Database, cybersecurity framework provided by the National Institute of Standards and Technology (NIST), and/or the Computer Emergency Response Team (CERT) Coordination Center Database. As another example, enterprise data storage platform 314 may be configured to store and/or otherwise maintain enterprise risk scores for various vulnerabilities.

Although mitigation factor analysis system 304, machine learning system 306, applications 308, enterprise computing infrastructure 312, and enterprise data storage platform 314 are shown as separate elements from vulnerability score determination system 101, one or more of them may be within the same structure.

In one or more arrangements, aspects of the present disclosure may be implemented with a computing device. FIG. 4 illustrates a block diagram of an example computing environment including vulnerability score determination device 400 that may be used in accordance with one or more aspects described herein. The vulnerability score determination device 400 may be a computing device, such as a personal computer (e.g., a desktop computer), server, laptop computer, notebook, tablet, smartphone, etc. The vulnerability score determination device 400 may have a data collection module 401 for retrieving and/or analyzing data as described herein. The data collection module 401 may be implemented with one or more processors and one or more storage units (e.g., databases, RAM, ROM, and other computer-readable media), one or more application specific integrated circuits (ASICs), and/or other hardware components (e.g., resistors, capacitors, power sources, switches, multiplexers, transistors, inverters, etc.). Throughout this disclosure, the data collection module 401 may refer to the software and/or hardware used to implement the data collection module 401. In cases where the data collection module 401 includes one or more processors, such processors may be specially configured to perform the processes disclosed herein. Additionally, or alternatively, the data collection module 401 may include one or more processors configured to execute computer-executable instructions, which may be stored on a storage medium, to perform the processes disclosed herein. In some examples, vulnerability score determination device 400 may include one or more processors 403 in addition to, or instead of, the data collection module 401. The processor(s) 403 may be configured to operate in conjunction with data collection module 401. Both the data collection module 401 and the processor(s) 403 may be capable of controlling operations of the vulnerability score determination device 400 and its associated components, including RAM 405, ROM 407, an input/output (I/O) module 409, a network interface 411, and memory 413. For example, the data collection module 401 and processor(s) 403 may each be configured to read/write computer-executable instructions and other values from/to the RAM 405, ROM 407, and memory 413.

The I/O module 409 may be configured to be connected to an input device 415, such as a microphone, keypad, keyboard, touchscreen, and/or stylus through which a user of the vulnerability score determination device 400 may provide input data. For example, information related to mitigation efforts of an enterprise organization may be provided via input device 415. The I/O module 409 may also be configured to be connected to a display device 417, such as a monitor, television, touchscreen, etc., and may include a graphics card. For example, the display device 417 may be configured to provide scores, such as, for example, temporal scores, mitigation factor scores, and/or enterprise risk scores. The display device 417 and input device 415 are shown as separate elements from the vulnerability score determination device 400; however, they may be within the same structure. System administrators may use the input device 415 to make updates to the data collection module 401, such as software updates. Meanwhile, the display device 417 may assist the system administrators and users to confirm/appreciate their inputs.

The memory 413 may be any computer-readable medium for storing computer-executable instructions (e.g., software). The instructions stored within memory 413 may enable the vulnerability score determination device 400 to perform various functions. For example, memory 413 may store software used by the vulnerability score determination device 400, such as an operating system 419 and application programs 421, and may include an associated database 423.

Although not shown in FIG. 4, various elements within memory 413 or other components in the vulnerability score determination device 400 may include one or more caches, for example, CPU caches used by the processor 403, page caches used by the operating system 419, disk caches of a hard drive, and/or database caches used to cache content from database 423. For embodiments including a CPU cache, the CPU cache may be used by one or more processors in the processor 403 to reduce memory latency and access time. In such examples, the processor 403 may retrieve data from or write data to the CPU cache rather than reading/writing to memory 413, which may improve the speed of these operations. These types of caches and others may be included in various embodiments, and may provide potential advantages in certain implementations of retrieving and analyzing driving data, such as faster response times and less dependence on network conditions when transmitting/receiving driving data. In some examples, database 423 may receive data from one or more risk scoring servers 430 (e.g., Common Vulnerability Scoring System (CVSS) database), and/or from one or more vulnerability servers 440 (e.g., National Vulnerability Database, Open Source Vulnerability Database, cybersecurity frameworks provided by the National Institute of Standards and Technology (NIST), and/or the Computer Emergency Response Team (CERT) Coordination Center Database).

The network interface 411 may allow vulnerability score determination device 400 to connect to and communicate with a network 450. The network 450 may be any type of network, including a local area network (LAN) and/or a wide area network (WAN), such as the internet, a cellular network, or satellite network. Through network 450, vulnerability score determination device 400 may communicate with one or more risk scoring servers 430 and/or one or more vulnerability servers 440.

Network interface 411 may connect to the network 450 via communication lines, such as coaxial cable, fiber optic cable, etc., or wirelessly using a cellular backhaul or a wireless standard, such as IEEE 802.11, IEEE 802.15, IEEE 802.16, etc. Further, network interface 411 may use various protocols, including TCP/IP, Ethernet, File Transfer Protocol (FTP), Hypertext Transfer Protocol (HTTP), etc., to communicate with one or more risk scoring servers 430 or one or more vulnerability servers 440.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, LTE, and WiMAX, is presumed. The various computing devices and mobile device location and configuration system components described herein may be configured to communicate using any of these network protocols or technologies.

Figure 5:
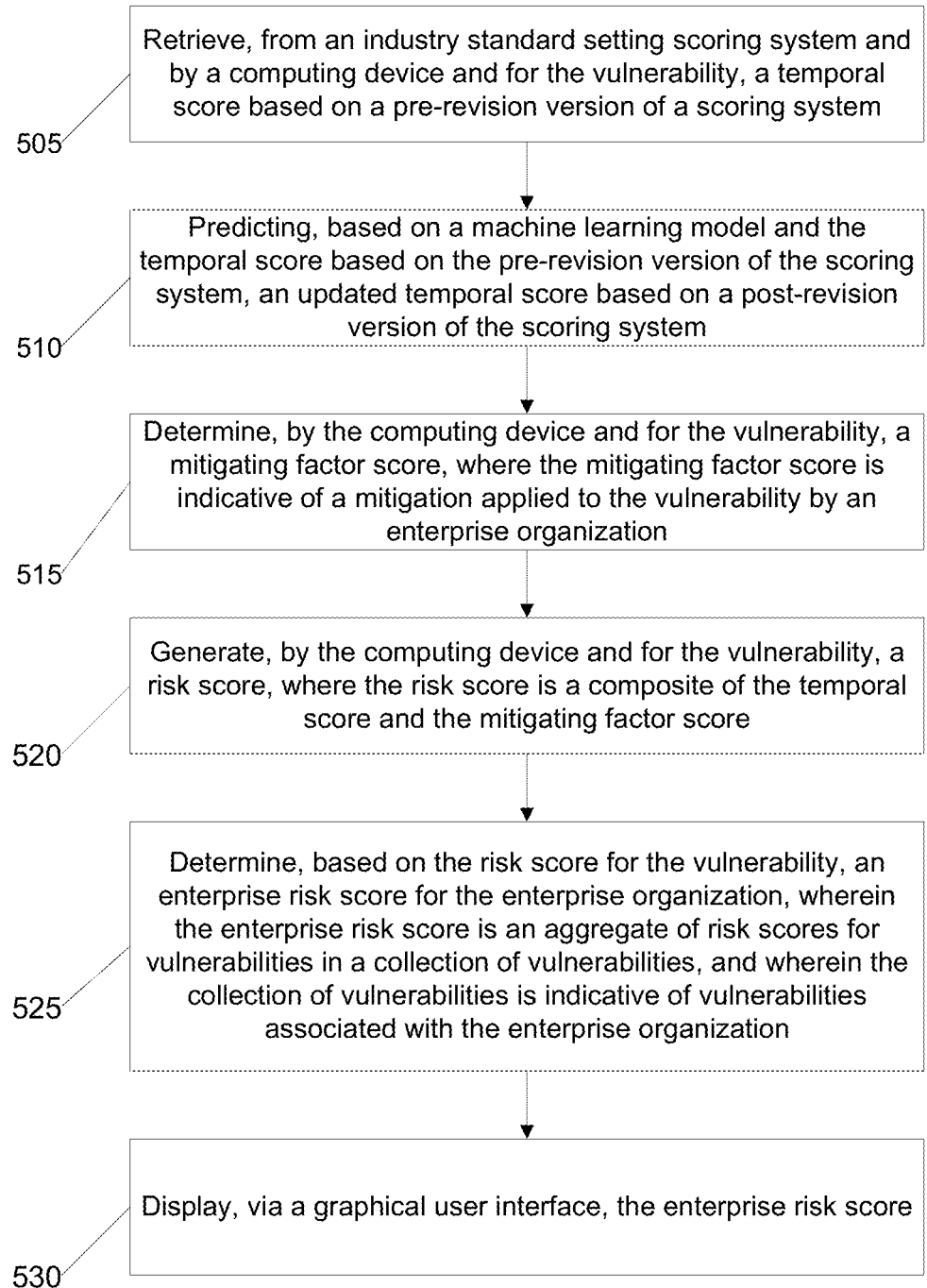
FIG. 5 illustrates an example method for determining vulnerability based on a mitigating factor in accordance with one embodiment of the invention described herein.

The steps that follow in FIG. 5 may be implemented by one or more of the components in FIGS. 1 through 3 and/or other components, including other computing devices. FIG. 5 illustrates an example method for determining vulnerability based on a mitigating factor in accordance with one embodiment of the invention described herein.

At step 505, vulnerability score determination system 101 may retrieve, from an industry standard setting scoring system and by the computing device and for the vulnerability, a temporal score based on a pre-revision version of a scoring system. In some embodiments, the industry standard scoring system may be, for example, a Common Vulnerability Scoring System (CVSS), provided by the National Institute of Standards and Technology (NIST).

At step 510, vulnerability score determination system 101 may predict, based on a machine learning model and the temporal score based on the pre-revision version of the scoring system, an updated temporal score based on a post-revision version of the scoring system. For example, the machine learning model may be trained to update the temporal score based on the pre-revision version to an updated temporal score based on the post-revision version of the scoring system.

At step 515, vulnerability score determination system 101 may determine, by the computing device and for the vulnerability, a mitigating factor score, where the mitigating factor score is indicative of a mitigation applied to the vulnerability by an enterprise organization. In some embodiments, vulnerability score determination system 101 may determine (1) an effectiveness measure indicative of a success of the mitigation, (2) a completeness measure indicative of a percentage of total enterprise assets that the mitigation has been applied to, and (3) an enforcement measure indicative of a success in enforcing the mitigation. In some embodiments, vulnerability score determination system 101 may determine the mitigating factor score by determining a weighted combination of the effectiveness measure, the completeness measure, and the enforcement measure.

At step 520, vulnerability score determination system 101 may generate, by the computing device and for the vulnerability, a risk score, where the risk score is a composite of the temporal score and the mitigating factor score. In some embodiments, vulnerability score determination system 101 may determine the risk score based on an additive relationship between the updated temporal score and the mitigating factor score, an additive relationship between the updated temporal score and an exponential decay value of the mitigating factor score, and/or a product of the updated temporal score and an exponential decay value of the mitigating factor score.

At step 525, vulnerability score determination system 101 may determine, based on the risk score for the vulnerability, an enterprise risk score for the enterprise organization, where the enterprise risk score is an aggregate of risk scores for vulnerabilities in a collection of vulnerabilities, and where the collection of vulnerabilities is indicative of vulnerabilities associated with the enterprise organization.

At step 530, vulnerability score determination system 101 may display, via a graphical user interface, the enterprise risk score.

Figure 6:
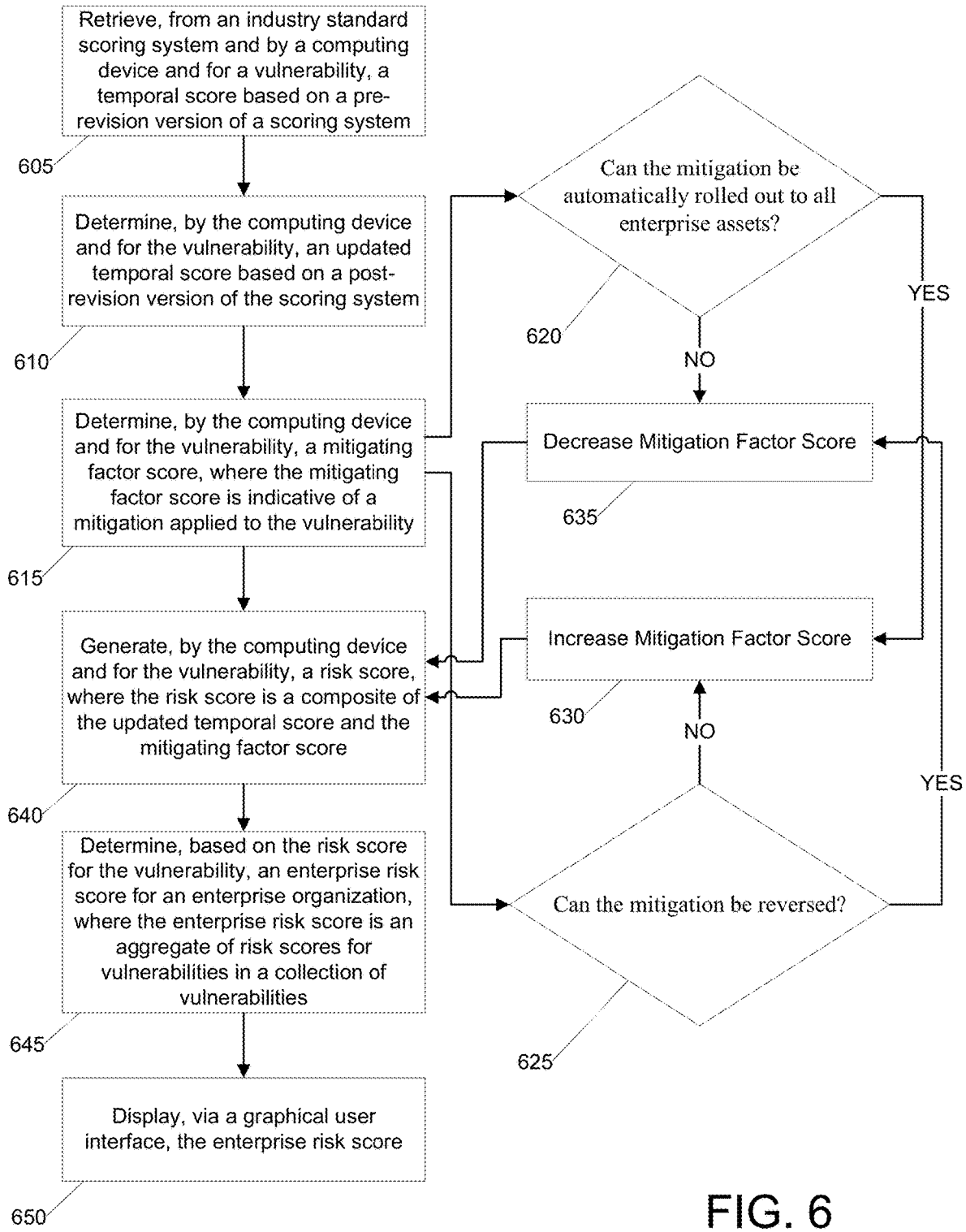
FIG. 6 illustrates an example method for determining vulnerability based on a mitigating factor in accordance with another embodiment of the invention described herein.

The steps that follow in FIG. 6 may be implemented by one or more of the components in FIGS. 1 through 3 and/or other components, including other computing devices. FIG. 6 illustrates an example method for determining vulnerability based on a mitigating factor in accordance with another embodiment of the invention described herein.

At step 605, vulnerability score determination system 101 may retrieve, from an industry standard scoring system, such as, for example, a Common Vulnerability Scoring System (CVSS) and by a computing device and for a vulnerability, a temporal score based on a pre-revision version of the scoring system.

At step 610, vulnerability score determination system 101 may determine, by the computing device and for the vulnerability, an updated temporal score based on a post-revision version of the scoring system. In some examples, determining the updated temporal score may be performed using machine learning models, as discussed herein.

At step 615, vulnerability score determination system 101 may determine, by the computing device and for the vulnerability, a mitigating factor score, where the mitigating factor score is indicative of a mitigation applied to the vulnerability by an enterprise organization. In some embodiments, the process may proceed to step 620 and/or to step 625.

In some embodiments, at step 620, vulnerability score determination system 101 may determine whether the mitigation may be automatically rolled out to all enterprise assets of the enterprise organization. Upon a determination that the mitigation may be automatically rolled out to all enterprise assets of the enterprise organization, the process may proceed to step 630. Upon a determination that the mitigation may not be automatically rolled out to all enterprise assets of the enterprise organization, the process may proceed to step 635. At step 630, vulnerability score determination system 101 may increase the mitigation factor score. At step 635, vulnerability score determination system 101 may decrease the mitigation factor score. In some embodiments, the process may proceed to step 640.

Likewise, in some embodiments, at step 625, vulnerability score determination system 101 may determine whether the mitigation may be reversed after being applied. Upon a determination that the mitigation may not be reversed after being applied, the process may proceed to step 630. Upon a determination that the mitigation may be reversed after being applied, the process may proceed to step 635. At step 630, vulnerability score determination system 101 may increase the mitigation factor score. At step 635, vulnerability score determination system 101 may decrease the mitigation factor score. In some embodiments, the process may proceed to step 640.

At step 640, vulnerability score determination system 101 may generate, by the computing device and for the vulnerability, a risk score, where the risk score is a composite of the updated temporal score and the mitigating factor score.

At step 645, vulnerability score determination system 101 may determine, based on the risk score for the vulnerability, an enterprise risk score for the enterprise organization, where the enterprise risk score is an aggregate of risk scores for vulnerabilities in a collection of vulnerabilities, and where the collection of vulnerabilities is indicative of vulnerabilities associated with the enterprise organization.

At step 650, vulnerability score determination system 101 may display, via a graphical user interface, the enterprise risk score.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the figures may be performed in other than the recited order, and that one or more steps illustrated may be optional in accordance with aspects of the invention.

What is claimed is:

1. A method comprising:
   retrieving, from an industry standard setting scoring system and by a computing device and for a vulnerability, a temporal score based on a pre-revision version of a scoring system;
   predicting, based on a machine learning model and the temporal score based on the pre-revision version of the scoring system, an updated temporal score based on a post-revision version of the scoring system, and training the machine learning model to predict the updated temporal score;
   determining, by the computing device and for the vulnerability, a mitigating factor score, wherein the mitigating factor score is indicative of a mitigation applied to the vulnerability by an enterprise organization, wherein the mitigating factor score is increased responsive to a determination that the mitigation is able to automatically be rolled out to enterprise assets of the enterprise organization and decreased otherwise, and wherein the mitigation factor score is increased responsive to a determination that the mitigation is irreversible and decreased otherwise;
   generating, by the computing device and for the vulnerability, a risk score, wherein the risk score is a composite of the updated temporal score and the mitigating factor score, and wherein the risk score is decreased when the mitigation factor score is increased based on an exponential decay value of the mitigation factor score;
   determining, based on the risk score for the vulnerability, an enterprise risk score for the enterprise organization, wherein the enterprise risk score is an aggregate of risk scores for vulnerabilities in a collection of vulnerabilities, and wherein the collection of vulnerabilities is indicative of vulnerabilities associated with the enterprise organization;
   automatically rolling out the mitigation applied to the vulnerability to one or more of the enterprise assets of the enterprise organization, wherein automatically rolling out the mitigation comprises applying a patch for release for the vulnerability to the one or more of the enterprise assets such that the enterprise risk score is decreased with application of the patch; and
   displaying, via a graphical user interface, the enterprise risk score as decreased after application of the patch to the one or more of the enterprise assets.

2. The method of claim 1, further comprising:
   determining (1) an effectiveness measure indicative of a success of the mitigation, (2) a completeness measure indicative of a percentage of total enterprise assets that the mitigation has been applied to, and (3) an enforcement measure indicative of a success in enforcing the mitigation; and
   wherein determining the mitigating factor score further comprises determining a combination of the effectiveness measure, the completeness measure, and the enforcement measure.

3. The method of claim 2, further comprising:
   applying a first weight to the effectiveness measure;
   applying a second weight to the completeness measure;
   applying a third weight to the enforcement measure; and
   wherein determining the combination of the effectiveness measure, the completeness measure, and the enforcement measure further comprises determining a weighted combination based on the first weight, the second weight, and the third weight.

4. The method of claim 2, wherein determining the enforcement measure further comprises:
   determining whether the mitigation may be automatically rolled out to all enterprise assets.

5. The method of claim 2, wherein determining the enforcement measure further comprises:
   determining whether the enforcing of the mitigation may be prevented.

6. The method of claim 2, wherein determining the enforcement measure further comprises:
   determining whether the applying of the mitigation is reversible.

7. The method of claim 1, wherein the risk score is based on an additive relationship between the updated temporal score and the mitigating factor score.

8. The method of claim 1, wherein the risk score is based on a product of the updated temporal score and the exponential decay value of the mitigating factor score.

9. The method of claim 1, wherein the risk score is based on an additive relationship between the updated temporal score and the exponential decay value of the mitigating factor score.

10. The method of claim 1, wherein the machine learning model utilizes a gradient boosting technique.

11. An apparatus, comprising:
    a processor;
    a memory unit storing computer-executable instructions, which when executed by the processor, cause the apparatus to:
    retrieve, from an industry standard scoring system and by a computing device and for a vulnerability, a temporal score based on a pre-revision version of the scoring system;
    predict, based on a machine learning model and based on the temporal score based on the pre-revision version of a scoring system, an updated temporal score based on a post-revision version of the scoring system, and train the machine learning model to predict the updated temporal score;
    determine, by a computing device and for a vulnerability, a mitigating factor score, wherein the mitigating factor score is indicative of a mitigation applied to the vulnerability by an enterprise organization, wherein the mitigating factor score is increased responsive to a determination that the mitigation is able to automatically be rolled out to enterprise assets of the enterprise organization and decreased otherwise, and wherein the mitigation factor score is increased responsive to a determination that the mitigation is irreversible and decreased otherwise;
    generate, by the computing device and for the vulnerability, a risk score, wherein the risk score is a composite of the updated temporal score and the mitigating factor score, and wherein the risk score is decreased when the mitigation factor score is increased based on an exponential decay value of the mitigation factor score;
    determine, based on the risk score for the vulnerability, an enterprise risk score for the enterprise organization, wherein the enterprise risk score is an aggregate of risk scores for vulnerabilities in a collection of vulnerabilities, and wherein the collection of vulnerabilities is indicative of vulnerabilities associated with the enterprise organization;
    automatically roll out the mitigation applied to the vulnerability to one or more of the enterprise assets of the enterprise organization, wherein automatically rolling out the mitigation comprises applying a patch for release for the vulnerability to the one or more of the enterprise assets such that the enterprise risk score is decreased with application of the patch; and
    display, via a graphical user interface, the enterprise risk score as decreased after application of the patch to the one or more of the enterprise assets.

12. The apparatus of claim 11, wherein the machine learning model utilizes a gradient boosting technique.

13. The apparatus of claim 11, wherein the computer-executable instructions, when executed by the processor, further cause the apparatus to:
    determine (1) an effectiveness measure indicative of a success of the mitigation, (2) a completeness measure indicative of a percentage of total enterprise assets that the mitigation has been applied to, and (3) an enforcement measure indicative of a success in enforcing the mitigation; and
    wherein the computer-executable instructions, when executed by the processor, further cause the apparatus to:
    determine a weighted combination of the effectiveness measure, the completeness measure, and the enforcement measure.

14. The apparatus of claim 13, wherein the computer-executable instructions, when executed by the processor, further cause the apparatus to:
    determine one or more of whether the mitigation may be automatically rolled out to all enterprise assets, or whether the applying of the mitigation is reversible.

15. The apparatus of claim 11, wherein the risk score is based on one of: (1) a first additive relationship between the temporal score and the mitigating factor score, (2) a second additive relationship between the temporal score and the exponential decay value of the mitigating factor score, or (3) a product of the temporal score and the exponential decay value of the mitigating factor score.

16. One or more non-transitory computer-readable media storing instructions that, when executed by a computing device, cause the computing device to:
    retrieve, from an industry standard setting scoring system and by a computing device and for a vulnerability, a temporal score based on a pre-revision version of a scoring system;
    predict, based on a machine learning model and the temporal score based on the pre-revision version and by the computing device and for the vulnerability, an updated temporal score based on a post-revision version of the scoring system, and train the machine learning model to predict the updated temporal score;
    determine, by the computing device and for the vulnerability, a mitigating factor score, wherein the mitigating factor score is indicative of a mitigation applied to the vulnerability by an enterprise organization, and wherein the mitigating factor score is based on (1) an effectiveness measure indicative of a success of the mitigation, (2) a completeness measure indicative of a percentage of total enterprise assets that the mitigation has been applied to, and (3) an enforcement measure indicative of a success in enforcing the mitigation, wherein the mitigating factor score is increased responsive to a determination that the mitigation is able to automatically be rolled out to enterprise assets of the enterprise organization and decreased otherwise, and wherein the mitigation factor score is increased responsive to a determination that the mitigation is irreversible and decreased otherwise;

generate, by the computing device and for the vulnerability, a risk score, wherein the risk score is a composite of the updated temporal score and the mitigating factor score, and wherein the risk score is decreased when the mitigation factor score is increased based on an exponential decay value of the mitigation factor score;

determine, based on the risk score for the vulnerability, an enterprise risk score for the enterprise organization, wherein the enterprise risk score is an aggregate of risk scores for vulnerabilities in a collection of vulnerabilities, and wherein the collection of vulnerabilities is indicative of vulnerabilities associated with the enterprise organization; and automatically roll out the mitigation applied to the vulnerability to one or more of the enterprise assets of the enterprise organization, wherein automatically rolling out the mitigation comprises applying a patch for release for the vulnerability to the one or more of the enterprise assets such that the enterprise risk score is decreased with application of the patch; and display, via a graphical user interface, the enterprise risk score as decreased after application of the patch to the one or more of the enterprise assets.

17. The one or more non-transitory computer-readable media of claim 16, wherein the machine learning model utilizes a gradient boosting technique.

\* \* \* \* \*